United States Patent
Dequine

(10) Patent No.: US 8,771,575 B2
(45) Date of Patent: Jul. 8, 2014

(54) METHODS AND SYSTEMS FOR FORMING REINFORCED COMPOSITE ARTICLES HAVING VARIABLE THICKNESS CORNERS

(75) Inventor: Dustin Louis Dequine, Carbondale, CO (US)

(73) Assignee: Dieffenbacher GmbH Maschinen- und Anlagenbau, Eppingen (DE)

( * ) Notice: Subject to any disclaimer, the term of this patent is extended or adjusted under 35 U.S.C. 154(b) by 0 days.

(21) Appl. No.: 13/557,693

(22) Filed: Jul. 25, 2012

(65) Prior Publication Data

US 2013/0189482 A1 Jul. 25, 2013

Related U.S. Application Data

(60) Provisional application No. 61/512,207, filed on Jul. 27, 2011.

(51) Int. Cl.
*B29C 70/30* (2006.01)

(52) U.S. Cl.
USPC .......................................... 264/258; 425/521

(58) Field of Classification Search
USPC ....................................................... 264/258
See application file for complete search history.

(56) References Cited

U.S. PATENT DOCUMENTS

| | | | | |
|---|---|---|---|---|
| 3,655,863 | A * | 4/1972 | Andersen | 264/294 |
| 6,607,626 | B2 | 8/2003 | Taggart | |
| 6,939,423 | B2 | 9/2005 | Taggart | |
| 7,235,149 | B2 | 6/2007 | Taggart | |
| 7,622,066 | B2 * | 11/2009 | Brustad et al. | 264/257 |
| 8,007,894 | B2 | 8/2011 | Taggart | |
| 8,048,253 | B2 | 11/2011 | Cramer et al. | |
| 8,168,029 | B2 | 5/2012 | Cramer et al. | |
| 2002/0061374 | A1 | 5/2002 | O'Brien et al. | |
| 2005/0136204 | A1 | 6/2005 | Qiu et al. | |
| 2009/0057948 | A1 | 3/2009 | Krogager et al. | |
| 2010/0225016 | A1 | 9/2010 | Prebil et al. | |

FOREIGN PATENT DOCUMENTS

CA 2750197 8/2010

OTHER PUBLICATIONS

Hubert, P. and A. Poursartip, A method for the direct measurement of the fibre bed compaction curve of composite prepregs, Composites: Part A, vol. 32 (2001), pp. 179-187.*
Bai et al., "High Performance Thermoplastic Polymers and Composites," SAMPE 2005, Cytec Engineered Materials, Anaheim, California, 15 pages.
Dequine, Dusty, "A Novel Stamp Forming Technique for Crush Resistent Stringers Made of Thermoplastic Composites," presentation slides from Defense Manufacturing Conference, Nov. 29, 2011, Fiberforge Corporation, 25 pages.
Dequine et al., "A Novel Stamp Forming Technique for Crush Resistant Stringers Made of Thermoplastic Composites," SAMPE, May 21, 2012, Fiberforge Corporation, Glenwood Springs, Colorado, 18 pages.
International Search Report and Written Opinion mailed Jul. 8, 2013 in PCT Application No. PCT/US2012/048238.

* cited by examiner

*Primary Examiner* — Matthew Daniels
(74) *Attorney, Agent, or Firm* — Plumsea Law Group, LLC

(57) ABSTRACT

A method for making parts with variable thickness corners and parts with variable thickness corners are disclosed. The method includes laying up multiple plies to form a tailored blank, associating the blank with a convex and concave die, and applying pressure and heat so that material from at least one of the plies migrates towards a voided corner area formed between the dies.

30 Claims, 27 Drawing Sheets

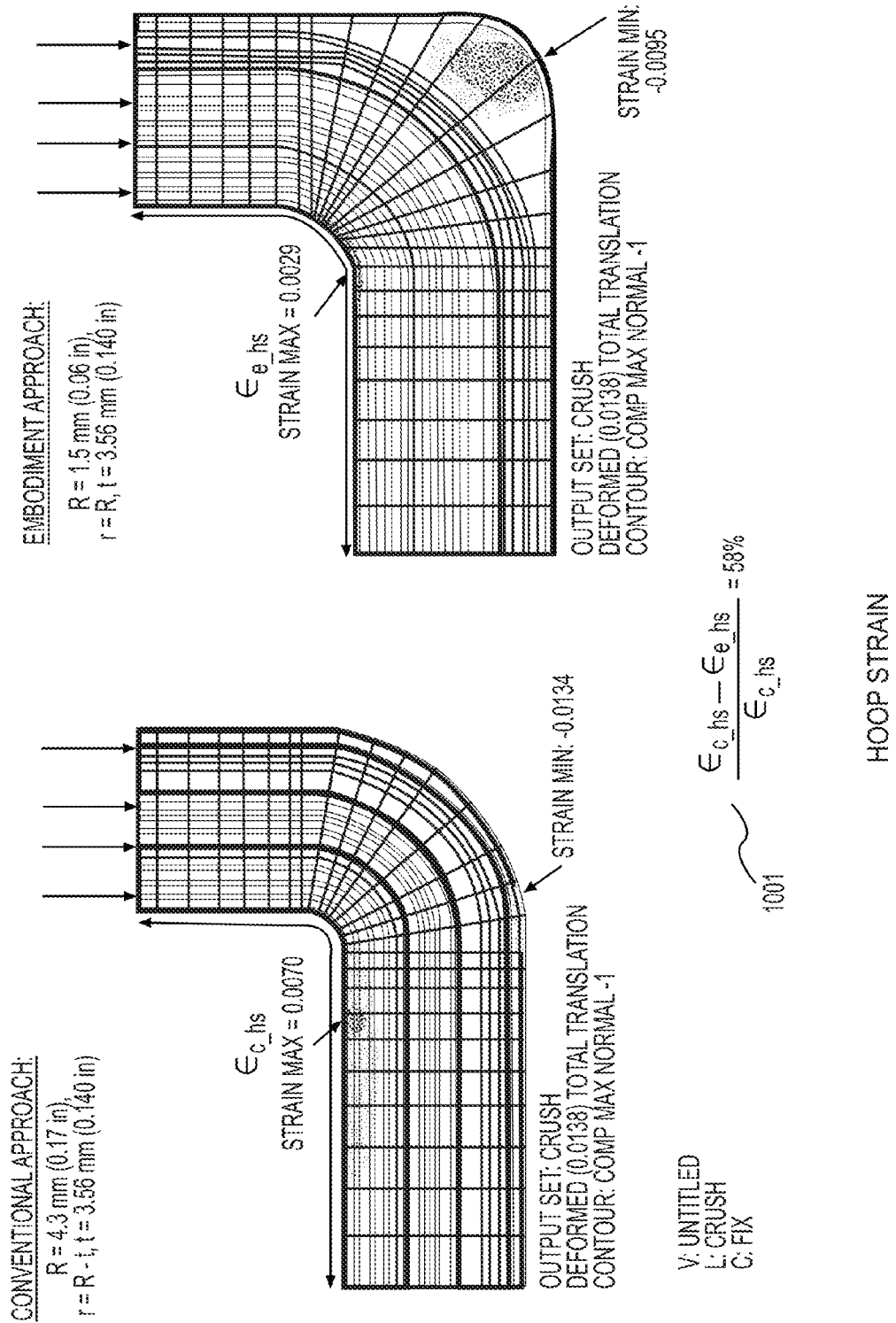
FIG. 10 HOOP STRAIN

METHODS AND SYSTEMS FOR FORMING REINFORCED COMPOSITE ARTICLES HAVING VARIABLE THICKNESS CORNERS

This application claims the benefit of U.S. Provisional Patent Application No. 61/512,207, filed Jul. 27, 2011, which is herein incorporated by reference in its entirety.

BACKGROUND

The present embodiments relate generally to advanced composites and, more particularly, to systems and methods for forming reinforced composite materials. The present embodiments are related to U.S. Pat. No. 6,607,626, issued Aug. 19, 2003; U.S. Pat. No. 6,939,423, issued Sep. 6, 2005; U.S. Pat. No. 7,235,149, issued Jun. 26, 2007; U.S. Pat. No. 8,007,894, issued Aug. 20, 2011; U.S. Pat. No. 8,048,253, issued Nov. 1, 2011; and U.S. Pat. No. 8,168,029, issued May 2, 2012, all of which are herein incorporated by reference in their entirety.

Advanced composite materials are increasingly used in high-performance structural products that require low weight and high strength and/or stiffness. Composite materials are engineered materials that comprise two or more components. Polymer composites may combine reinforcing fibers such as carbon fiber, glass fiber, or other reinforcing fibers with a thermosetting or thermoplastic polymer resin such as epoxy, nylon, polyester, polypropylene, or other resins. The fibers typically provide the stiffness and strength along the direction of the fiber length, and the resin provides shape and toughness and acts to transfer load between and among the fibers. The structural performance of an advanced composite part may increase with increased fiber-to-resin ratio (also called fiber volume fraction), increased fiber length, closer alignment of fiber orientation and the load path through the part (in contrast to random fiber orientation), and the straightness of the fibers. The weight of an advanced composite part can also be optimized by selectively adding or subtracting material according to where it is highly and lightly stressed.

Typically, the manufacture of high-performance, advanced composite parts is a slow and labor-intensive process. Thus, several approaches for automating the fabrication of advanced composite parts have been developed to reduce hand labor, decrease cycle time, and improve part quality and repeatability. Such machines are used to fabricate small and large parts ranging from aircraft fuselages and internal structural members to pressure vessels, pipes, blades for wind turbines, and wing skins. For thermoplastic applications, these machines typically place tape material directly on a mandrel or a mold using a material placement head mounted on a multi-axis numerically controlled machine. As the material is laid up, it is consolidated with any underlying layers. This is called "in situ" consolidation.

A different approach, described in U.S. Pat. Nos. 6,607,626 and 6,939,423, which are herein incorporated by reference, is to lay up a substantially flat "tailored blank" where all the plies of the composite laminate are only tacked together. Once the tailored blank has been made, subsequent processing steps are used to consolidate the plies together and form the blank into its final shape.

Forming tailored blanks into desired parts can be challenging, especially when the parts must accommodate significant structural loads. For example, composite components must often meet design specifications that include high vertical loads. In cases where the high compressive loads pass through bends and corners of a composite part, high out-of-plane loads can exist that limit the strength to far below the actual compressive strength of the composite material. One such type of structure is a stringer. Typical thermoformed or stamp-formed composite stringers, for example, are excellent in axial and bending loads, but suboptimal for concentrated vertical or "z-direction" compression loads. As vertical compression loads transfer around the radii of a stringer, the stringer radii will typically crush or yield well below the stringer web strength capability and additional local reinforcement may be required to meet load requirements.

There remains a need for systems and methods for rapidly producing advanced composite parts with corners of sufficient compressive strength and without an excessive number of plies.

SUMMARY

Embodiments provide a system and method for forming reinforced composite articles having variable thickness corners, at short cycle-times. Embodiments form parts with corners and bends with a thickness thicker than the nominal thicknesses, creating profiles that resemble those of metal extrusions.

In one embodiment, a method is provided for manufacturing a composite part from a blank having a first ply oriented in a first direction and a second ply oriented in a second direction transverse to the first direction. The method includes positioning the blank between a convex die and a concave die, with the fibers in the first ply oriented generally parallel to a longitudinal direction in which a corner of the concave die extends, and with the second ply oriented generally transverse to the longitudinal direction in which the corner of the concave die extends. The method also includes pressing the blank between the convex die and concave die such that a portion of the first ply migrates into the corner.

In another embodiment, a method is provided for manufacturing a composite part from a blank, the blank having the fibers in a first ply oriented in a first direction and a second ply oriented in a second direction, where the second direction is different from the first direction. The method includes positioning the blank between a convex die and a concave die, with the second ply oriented generally parallel to a longitudinal direction in which a corner of the concave die extends. The method also includes pressing the blank between the convex die and concave die such that the thickness of a portion of the second ply in the corner increases and the thickness of a portion of the first ply in the corner does not substantially change.

In another embodiment, a composite part includes a corner associated with the interface of a first adjacent section of the part and a second adjacent section of the part. The corner has a first thickness, where the first thickness is measured between an interior surface of the corner and an exterior surface of the corner. The first adjacent part and the second adjacent part having thicknesses greater than or equal to a second thickness. The first thickness is substantially greater than the second thickness.

Other systems, methods, features, and advantages of the embodiments will be, or will become, apparent to one of ordinary skill in the art upon examination of the following figures and detailed description. It is intended that all such additional systems, methods, features, and advantages be included within this description and this summary, be within the scope of the embodiments, and be protected by the claims.

BRIEF DESCRIPTION OF THE DRAWINGS

The embodiments can be better understood with reference to the following drawings and description. The components in the figures are not necessarily to scale, emphasis instead being placed upon illustrating the principles of the embodiments. Moreover, in the figures, like reference numerals designate corresponding parts throughout the different views.

DETAILED DESCRIPTION

Embodiments provide methods and systems for forming composite parts having corners of variable thickness, at relatively short cycle-time operations. The term "variable thickness" applies to any portion having a non-constant thickness, i.e. a thickness that varies along any dimension of a portion or part. Embodiments may also provide methods and systems for forming fiber reinforced composite laminate articles such that the external radius of a bend or corner is less than the internal radius plus the laminate thickness outside of the corner (or equivalently, that the internal radius of a bend corner is greater than the external radius minus the laminate thickness outside of the corner).

As mentioned previously, composite laminate articles may comprise materials with corners. Some articles can include constant thickness corners. Other articles can include variable thickness corners. As described in further detail below, by varying the geometry of a corner (in this case the thickness through the corner), various structural properties of the composite laminate articles can be modified. In some embodiments, for example, using a variable thickness corner in a composite laminate article, as opposed to a constant thickness corner, could improve the strength of the composite laminate article.

For purposes of understanding the embodiments described below, a general discussion of compression loading in composite panels is described here. FIGS. 1 through 4 are intended to show exemplary composite panels and the effects of compression loading on these panels. This discussion here is only intended to be exemplary and it will be understood that applications of the embodiments are not limited to the types of materials (for example, composite panels, and more specifically composite panels utilizing stringers) described here.

Figure 1:
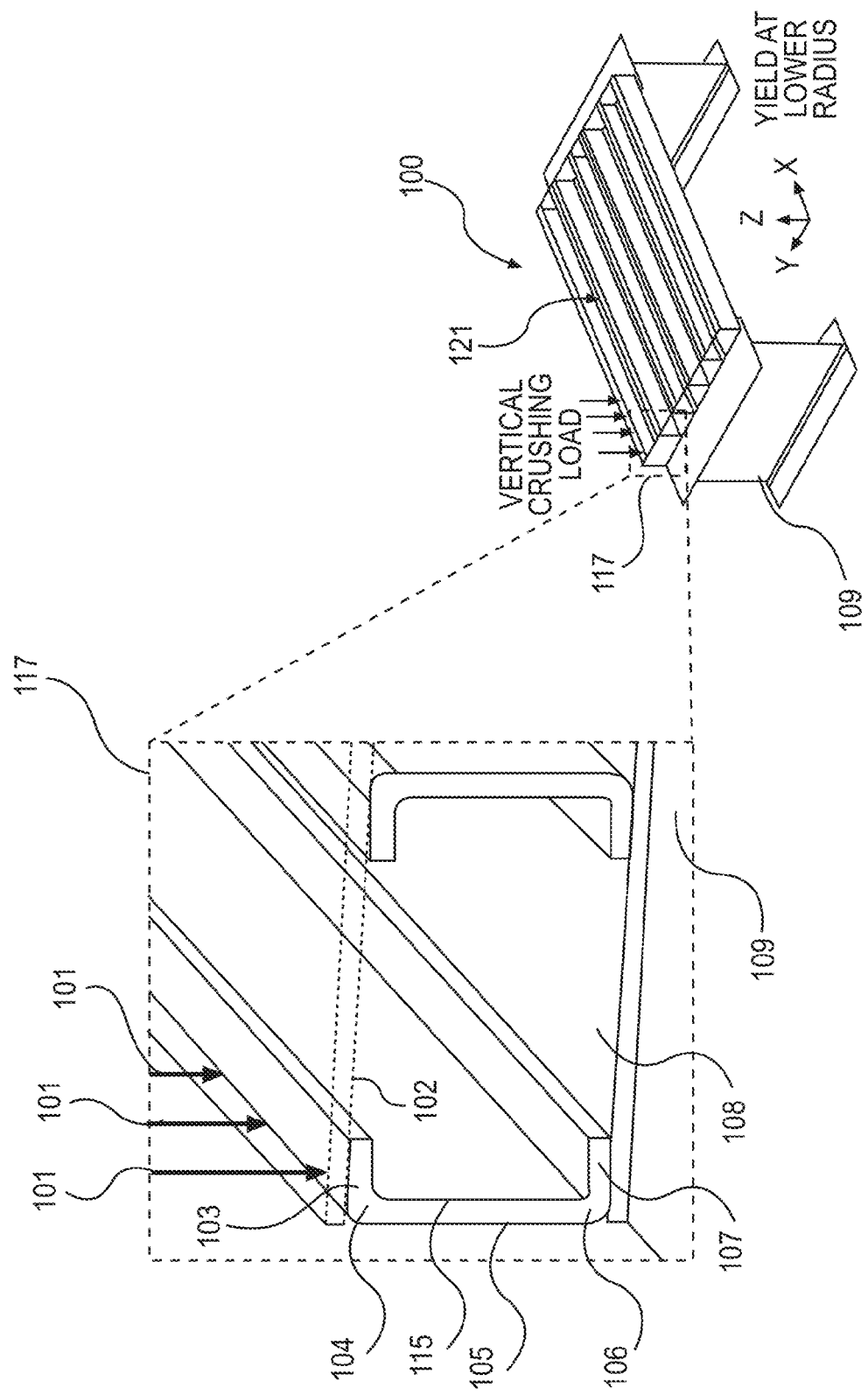
FIG. 1 is a schematic diagram illustrating an isometric view of an exemplary stringer-stiffened composite panel undergoing vertical radius-crushing loads.

FIG. 1 illustrates a typical vertical compression loading condition on a stringer-stiffened composite panel. In this situation, the panel is supported at either end, and a vertical load is applied near to one end. For purposes of clarity, FIG. 1 includes both a full isometric view of composite panel 100 as well as an enlarged region 117 of composite panel 100. Composite panel 100 comprises a plurality of stringers 121 disposed between a top facesheet 102 (which is partially transparent in FIG. 1) and a bottom facesheet 108. In the configuration shown in FIG. 1, a load 101 is transferred through the top facesheet 102, through various portions of stringer 115 including upper flange 103, upper radius 104, the web 105, the lower radius 106, the lower flange 107, and into the bottom facesheet 108 before finally being reacted by the underlying structure 109.

Figure 2:
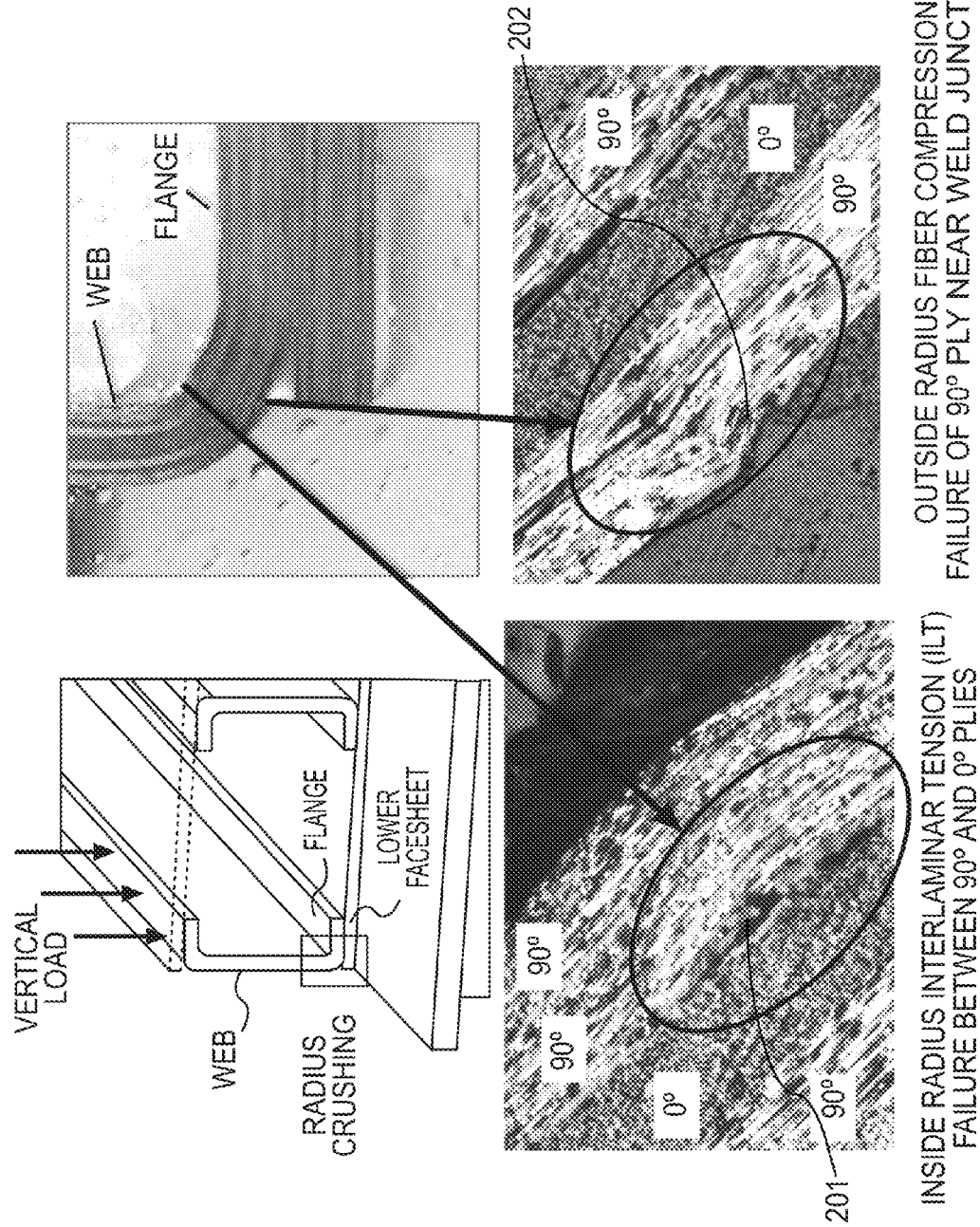
FIG. 2 is a schematic graphic containing an isometric view of a loaded stringer, a detailed view of a radius after it has failed, and two micrographs of typical modes of failure.

Generally, when stringers undergo vertical compression loads, the radii experience a complex interaction of shear and bending and begin to yield long before the web fails in net-section compression. FIG. 2 depicts the typical radius-crushing failure modes. Under vertical crushing loads, stringers begin to yield in interlaminar tension (ILT) on the internal radius 201, or in fiber failure at the facesheet junction along the external radius 202. The yielding associated with these failure modes often occurs at loads much lower than the ultimate compression capability of the stringer web. This is typically undesirable for some kinds of composite structures, including, for example, most aircraft structures, because yielding introduces locations for moisture ingression and fatigue initiation. If yielding occurs below 70 to 80% of ultimate load, then the structure becomes suboptimally sized by yielding, not ultimate load.

Figure 3:
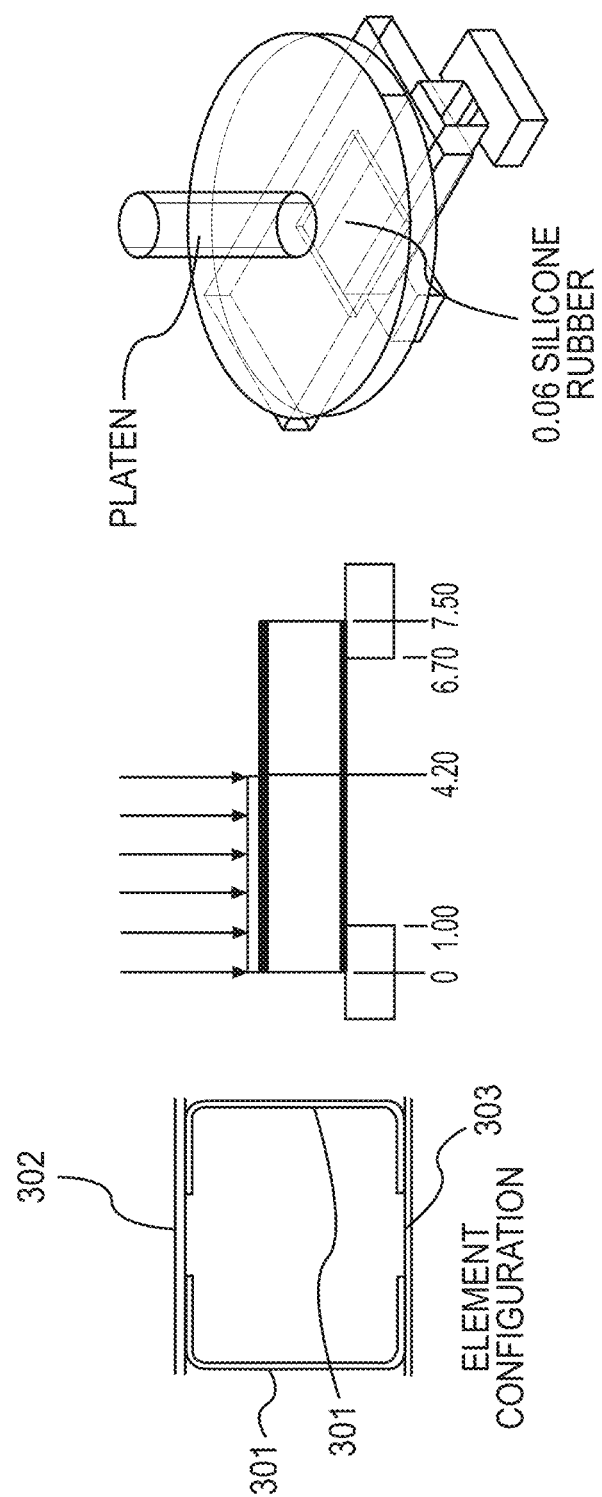
FIG. 3 is a schematic diagram illustrating a test configuration and radius-crushing test setup used to generate test data that substantiate the benefits of the embodiment.

FIG. 3 shows a radius-crushing test setup of an element composed of two c-channel stringers 301, a top facesheet 302, and a bottom facesheet 303, which may be used for testing strength as discussed in further detailed below.

Figure 4:
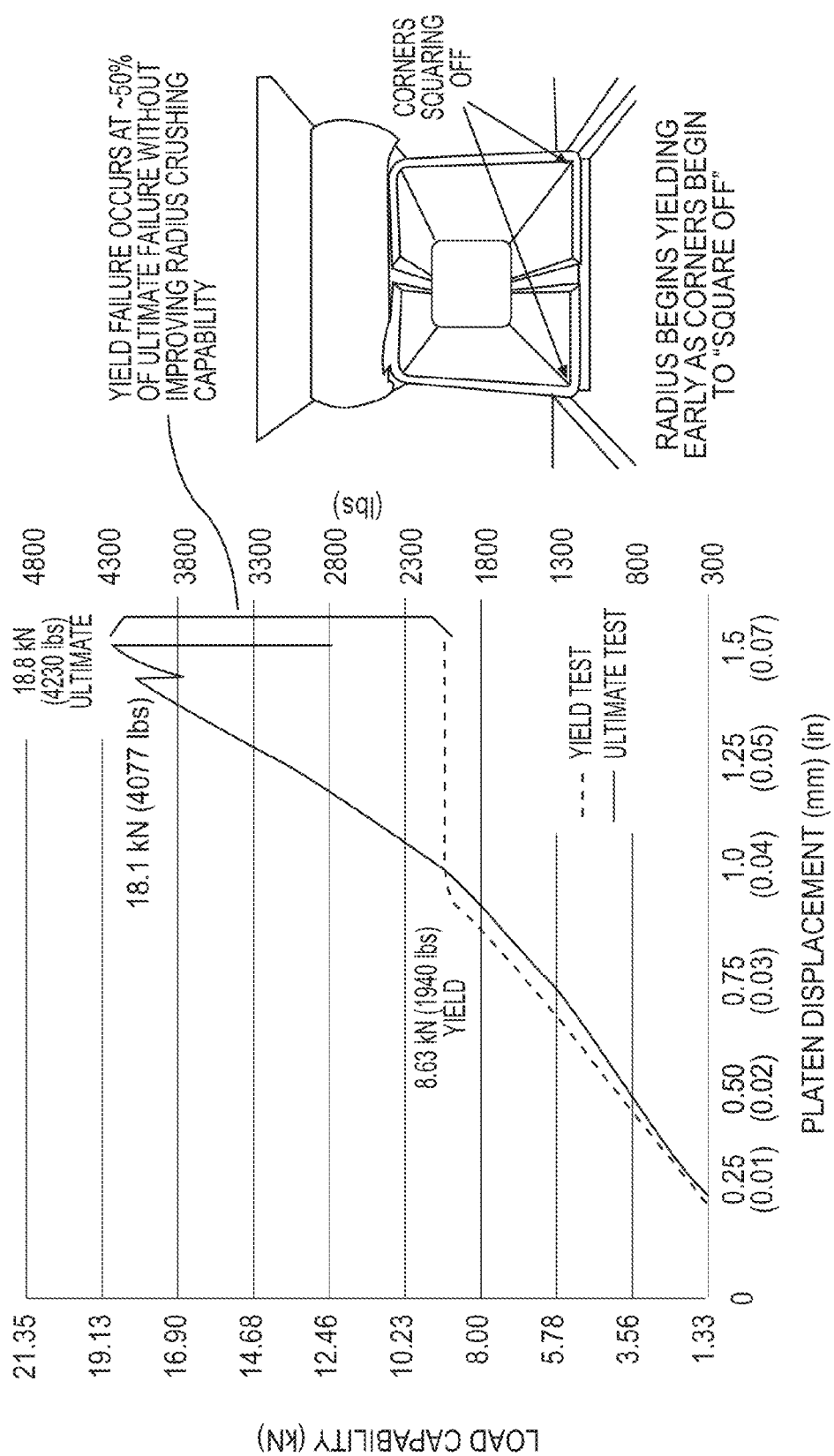
FIG. 4 is a schematic graph of test data, plotting the yield and ultimate load capability vs. platen displacement of a c-channel element with conventional corners. The figure also contains an image of the element, depicted in FIG. 3, as it is begins to yield.

FIG. 4 shows the strength capability of a 24-ply c-channel stringer element with 4.3 mm (0.17 inches) external radii, tested according to the configuration in FIG. 3. The element is first taken to the initiation of yield at 8.63 kN (1940 lbs) (dashed trace), when the load vs. displacement curve drops off significantly and the corners begin to "square off" as depicted in the picture on the right of FIG. 4. The element is then reloaded until ultimate net compression failure of the webs occurs at 18.8 kN (4230 lbs) (solid trace). This example demonstrates how the radius of a composite stringer yields below 50% of ultimate failure unless some improvements are implemented.

Stringer radius crush capability can be increased by adding plies to the stringer or by externally reinforcing the stringer. Adding global plies to a stringer is simple but heavy. Adding local padup plies are more efficient, and with advanced forming techniques, it is possible to form stringers with internal radii as small as 0.25 mm (0.010 inches). Extremely tight radii are generally avoided, however. A rule-of-thumb for aerospace structures is:

$$r \geq 2t + 0.030 \text{ inches}$$

where r=internal radius (inches) and t=laminate thickness (inches). The external radius can be increased in order to accommodate additional plies while maintaining a reasonable internal radius, however this may not always be possible due to interface or weight requirements.

Figure 5:
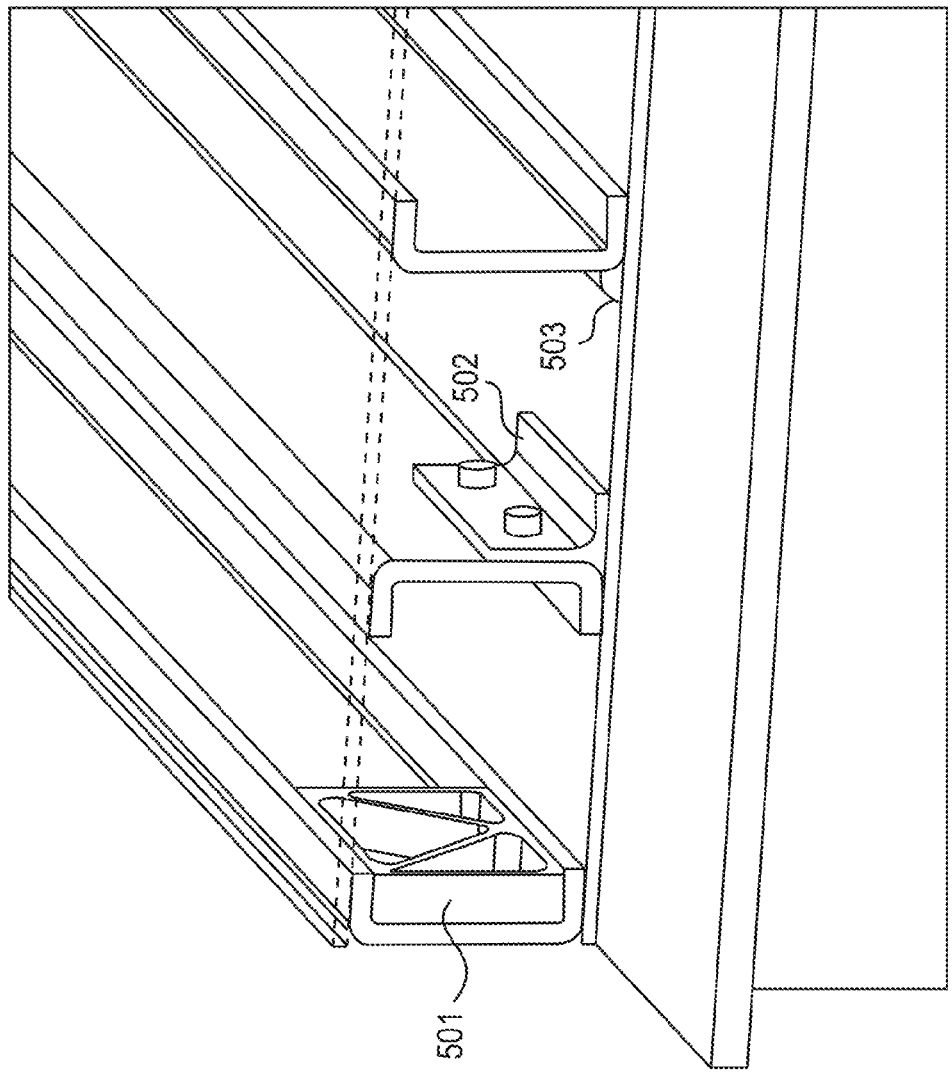
FIG. 5 is a schematic diagram of an isometric view of a stringer-stiffened composite panel with exemplary methods of using external reinforcements to improve the radius crush capability of stringers with conventional corners.

FIG. 5 illustrates several methods of externally reinforcing stringers for crush strength, including a metallic flange support fitting 501, a clip 502, and a radius filler 503. This use of external reinforcement adds additional weight and cost to a structure, and is typically implemented only as a last resort.

Figure 6:
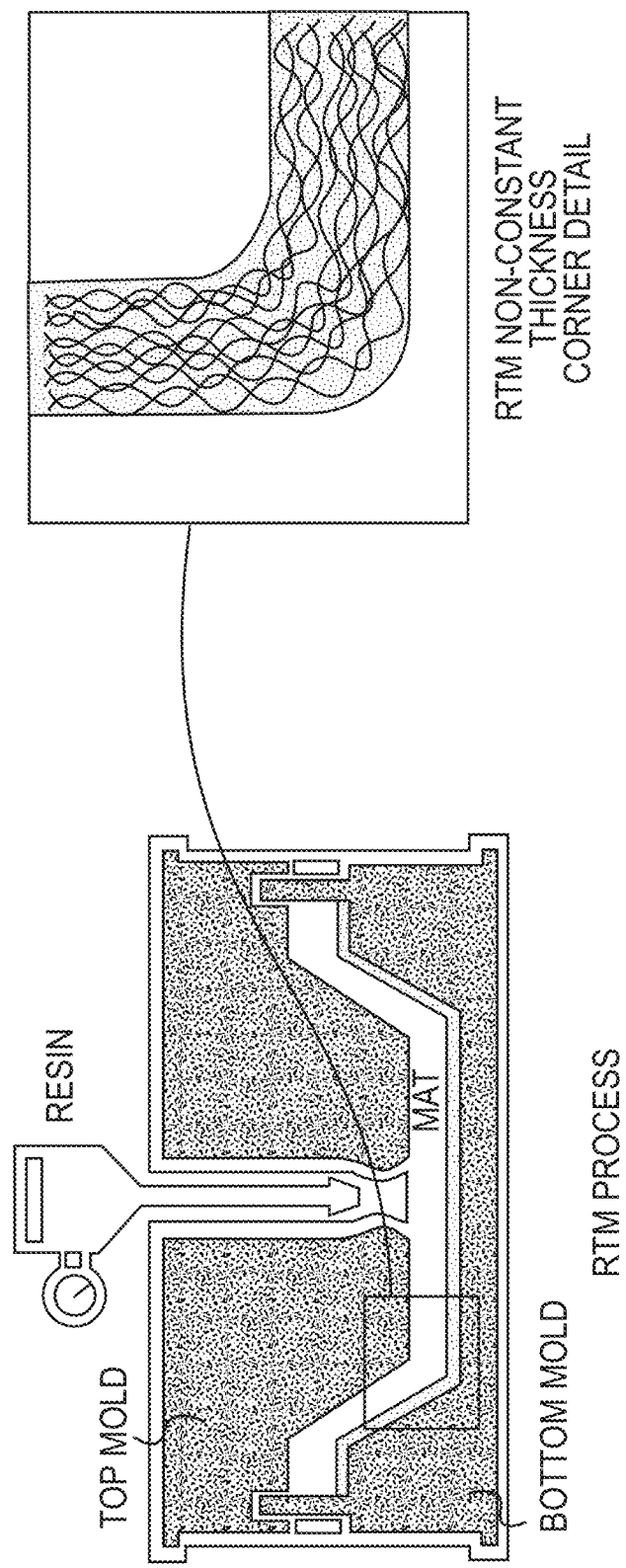
FIG. 6 is a schematic diagram illustrating an exemplary resin transfer molding (RTM) setup, including the matched molds and resin injection orifice. The figure also includes a detailed view of an exemplary variable thickness corner with woven fibers.

The conventional methods of resin transfer molding and vacuum-cured or autoclave-cured thermoset processes may be used to provide composite articles having variable thickness corners. However, this approach may suffer from undesirable drawbacks. For example, resin transfer molding (RTM), while having a short cycle-time, may require the use of inferior fabrics and resin, and may not allow a desired distribution of fibers and resin in the corners. As depicted in FIG. 6, in this method, a woven preform is placed inside a matched-metal die (containing the variable corner geometry) and injected with resin. RTM necessitates the use of woven or stitched fabrics, which have inherently lower structural properties than uni-directional laminates. This also requires the use of low-viscosity RTM resin with structural and environmental properties inferior to many engineered thermoplastic matrices. RTM using woven or stitched mat preforms do not allow a way to move fibers into corners, so variable thickness corners will have excessively high resin content.

Figure 7:
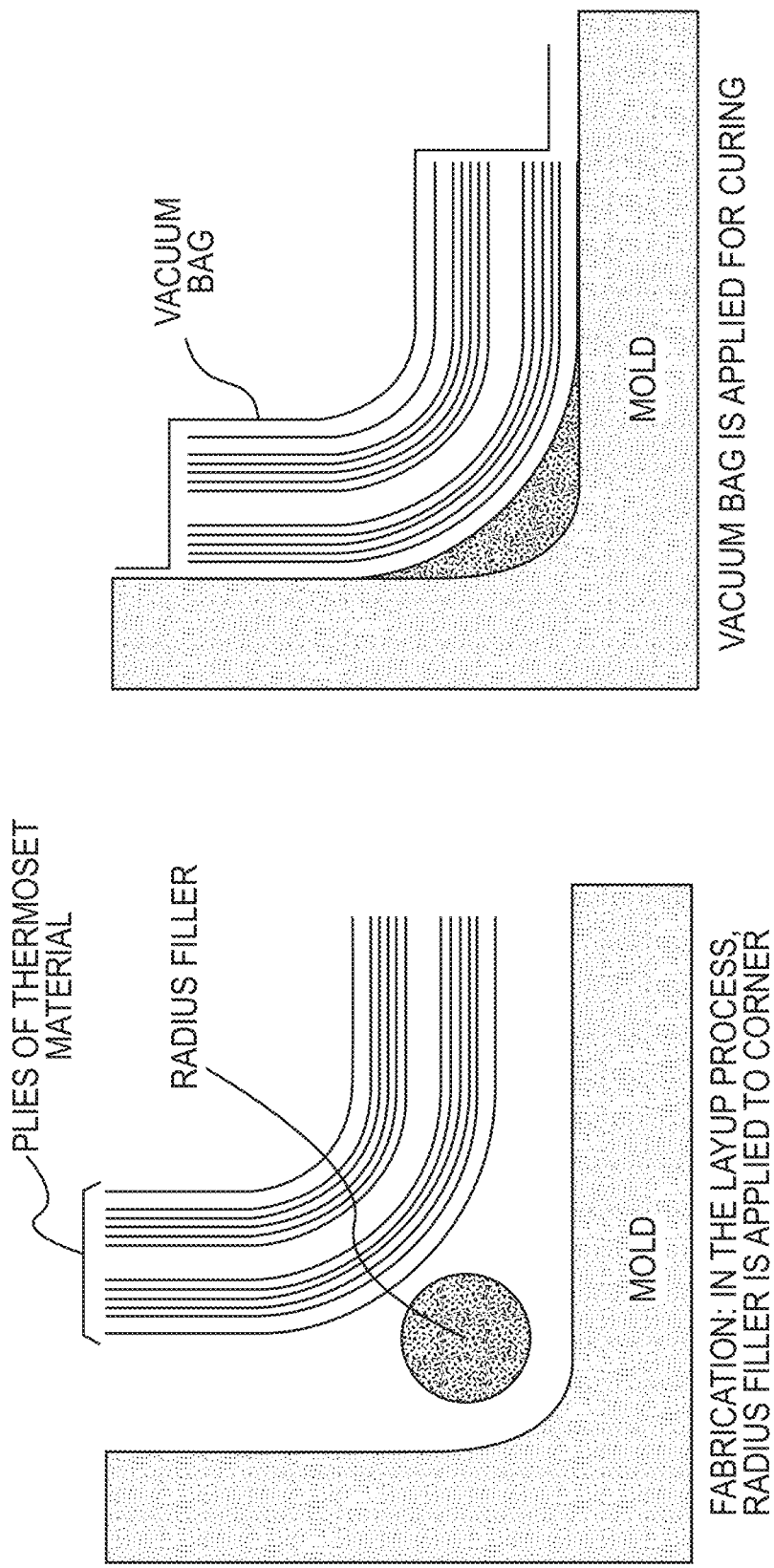
FIG. 7 is a schematic diagram illustrating an exemplary method of forming a variable thickness corner using a thermoset process and external radius fillers.

Vacuum-cured or autoclave-cured thermoset processes, on the other hand, have the potential for comparable structural properties, however they may require long cycle times, and therefore higher production costs. As depicted in FIG. 7, this method typically utilizes a pre-preg radius filler, or noodle, often comprising pultruded unidirectional tape or rolled tape/fabric. The radius filler is positioned into the variable thickness corner during the layup process. The radius filler occupies the space in the radius that would otherwise result in severe voids/porosity or a bridging condition. After layup, a vacuum bag is applied over the laminate to seal it to the tool, and the assembly is cured in an oven or autoclave. The multiple steps require high cycle times on the order of hours, versus minutes for thermoplastic stamp-forming.

FIGS. 8 through 24 and the associated discussion below describe embodiments of methods of forming parts with corners having variable thicknesses. These methods and the parts formed by the methods, provide benefits over some of the methods used for reinforcing parts discussed above.

Composite Part Corner Geometry

In order to understand some differences in the structural properties of constant thickness corners and variable thickness corners in composite laminate articles, FIGS. 8 through 12 depict two different exemplary configurations for the corners of a composite component. In particular, FIGS. 8 through 12 illustrate some of the structural features of components including constant thickness corners as well as some of the structural features of variable thickness corners. It will be understood that while the exemplary discussion is directed to constant thickness corners and variable thickness corners in stringer-type structural components, some of the features discussed here may likewise apply to a variety of different structural components that could include corners.

Figure 8:
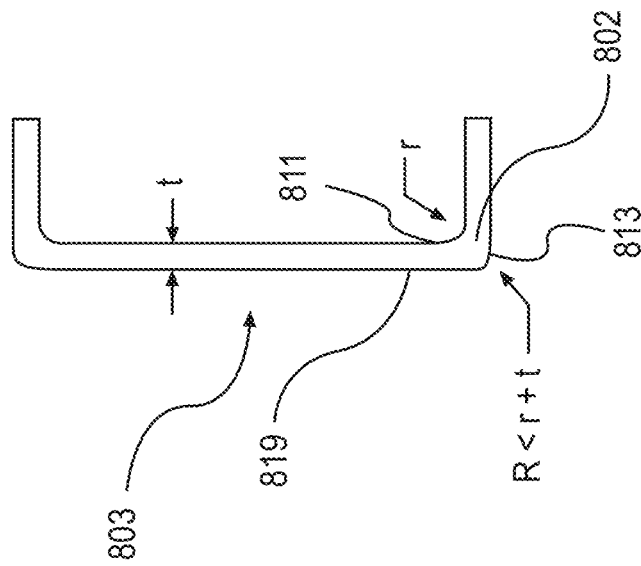
FIG. 8 is a schematic diagram illustrating a c-channel with constant thickness corners adjacent to a c-channel with exemplary variable thickness corners, according to one embodiment.
Figure 8:
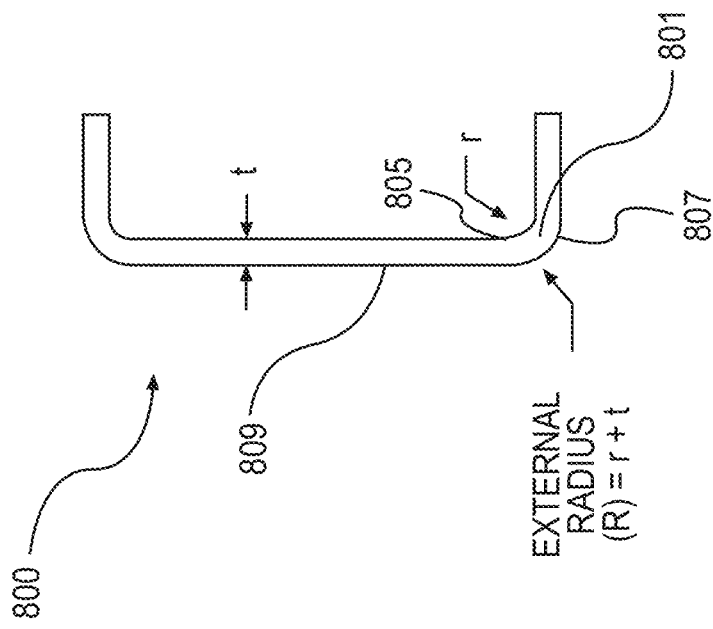

FIG. 8 illustrates schematic views of a first stringer 800 including a constant thickness corner 801 as well as a second stringer 803 including a variable thickness corner 802. As used herein, the term radius, and in particular the terms inner radius (or internal radius) and outer radius (or external radius) generally refer to the radius of curvature best approximating the geometry of the corresponding surface. As seen in FIG. 8, corner 801 is associated with an inner radius 805 and an outer radius 807 having values r and R, respectively. Moreover, first stringer 800 has a web portion 809 that is adjacent to corner 801, and which further has a laminate thickness t. As the thickness of first stringer 800 is substantially constant along corner 801, including the transitions between corner 801 and adjacent portions (such as web portion 809), outer radius 807 has a value approximately equal to inner radius 805 plus the laminate thickness t (i.e., the relation R=r+t holds approximately). In contrast, second stringer 803 is associated with an inner radius 811 and an outer radius 813 also having values r and R, respectively. Moreover, second stringer 803 has a web portion 819 that is adjacent to corner 802, and which further has a laminate thickness t. As the thickness of second stringer 803 varies at corner 802, outer radius 813 has a value that is less than the value of inner radius 811 plus the laminate thickness t (i.e., the relation R<r+t holds approximately).

Figure 9:
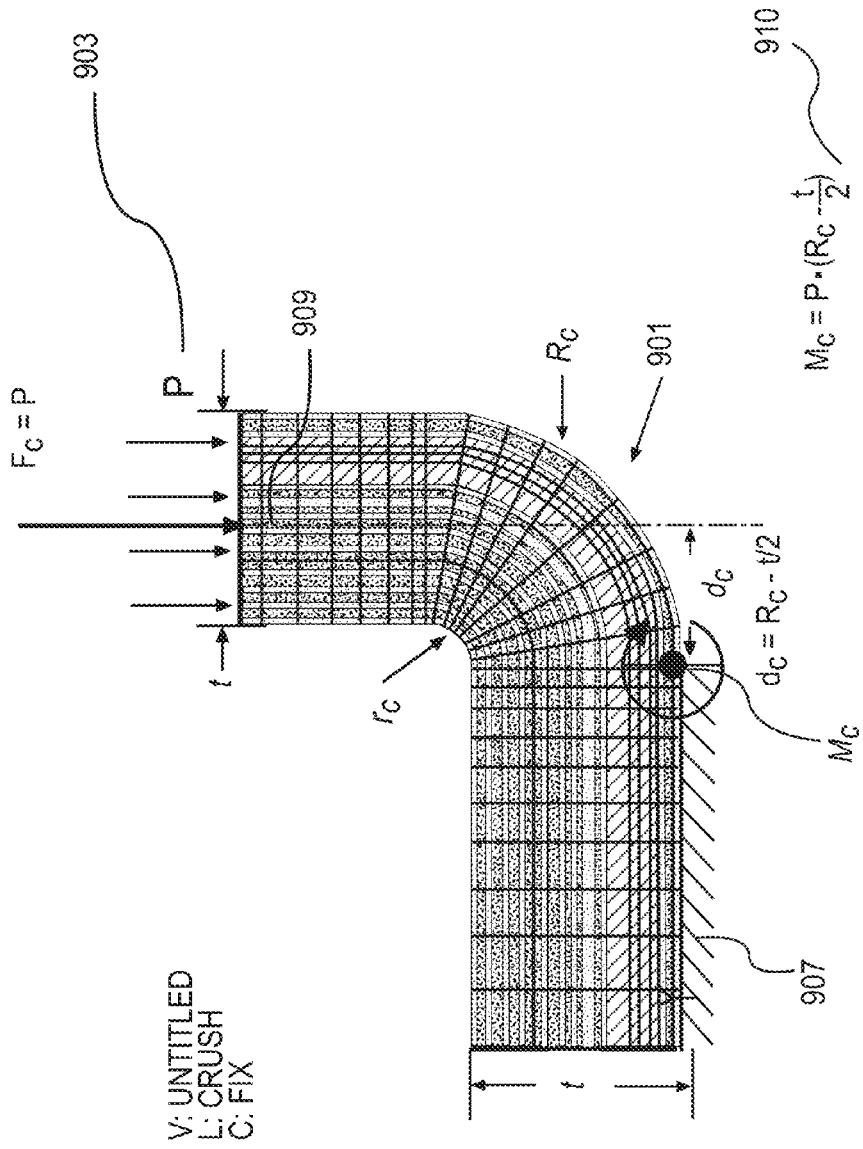
FIG. 9 is a schematic force and moment diagram of a constant-thickness corner and an embodiment of a variable-thickness corner undergoing vertical crushing loads.
Figure 9:
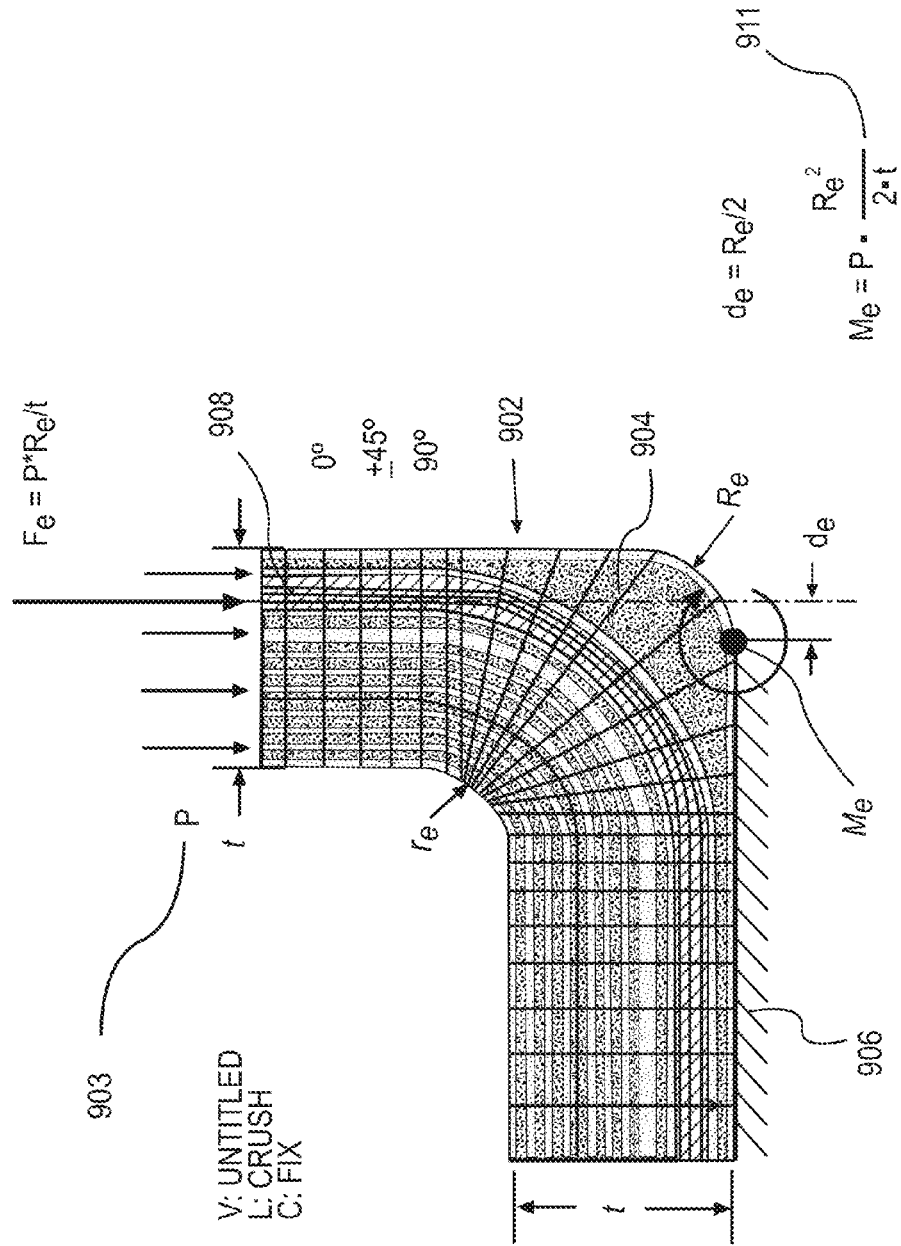

FIG. 9 illustrates two different embodiments of corner geometries for components of a composite laminate article, as modeled using a finite element model (FEM). In this case, a first embodiment comprises a portion of a first stringer 901 having a constant thickness corner and a second embodiment comprises a portion of a second stringer 902 having a variable thickness corner. The strength improvement of the variable thickness corner embodiment (i.e., stringer 902) is demonstrated analytically, by an FEM, and is further substantiated by testing.

The configuration used for comparison is a 26 ply AS4/PEEK c-channel of layup sequence $[90/0/90/45/-45]_s$ $[90/0]_{4s}$ (using the standard layup notation as in, for example, Boeing Drafting Standard, BDS-1330) and thickness of approximately 3.6 mm (0.14 inches). Stringer 901 has an external radii of 4.3 mm (0.17 inches) and a constant thickness corner, while stringer 902 has equal external and internal radii=1.5 mm (0.06 inches).

A load 903 applied to each corner is distributed across the top of the vertical web. The resultant loads, $F_c$ for the conventional corner and $F_e$ for the embodiment corner, are indicated by the vertical centerline 909 for stringer 901 and the vertical centerline 908 for stringer 902. For the constant thickness corner, the resultant load line of action 909 acts directly through the center of the vertical web, since the web is entirely unsupported. For the variable thickness corner, the portion of the web which is unsupported is $(R_e)/t$, and the line of action 908 is the distance $d_e = R_e/2$ from the support.

A critical stress area associated with radius crushing ILT mode of failure 201 (see FIG. 2) is at the area of maximum bending moment, located at the junction of the stringer horizontal flange with the fixed supports 907 and 906. The bending moment at the edge of the fixed supports is approximated as the resultant load times the distance from the support to the line of action.

For the constant thickness corner of stringer 901, the bending moment is:

$M_c = F_c \cdot d_c$ $M_c = P \cdot (R_c - t/2)$     (indicated in FIG. 9 as equation 910)

For the variable thickness corner of stringer 902, the bending moment is:

$M_e = F_e \cdot d_e$ $M_e = P \cdot (R_e^2/2 \cdot t)$     (indicated in FIG. 9 as equation 911)

For the radii and thicknesses of the configurations in FIG. 9:

$M_e/M_c = ((0.06 \text{ inches})^2/2*t)*1/(0.17 \text{ inches}-0.14 \text{ inches}/2)=0.13$ In these equations, "M" is the bending moment of the stringer at the radius tangent point and "d" is the distance from the radius tangent to the resultant applied load.

For an exemplary case with this simplified analytical method, the bending moment for the variable thickness corner stringer is 13% that of the constant thickness corner stringer. While this calculation demonstrates the potential of reduction in bending moment, an FEM is required to account for more complicated effects of layup and to calculate interlaminar shear and hoop stresses.

A NASTRAN 2D finite element analysis (FEA) was run to estimate the reduction in fiber and matrix stress for the constant thickness corner embodiment versus the variable thickness corner embodiment. A vertical compression load was applied to each configuration and the relative hoop and shear strains calculated for relative strength capability comparison.

The FEM used for stringer 901 and stringer 902 is a plane strain model and uses orthotropic plate elements to model both the conventional and embodiment configurations. Element properties are rotated for plane strain. As depicted in FIG. 9 the flange elements are constrained to the radius tangent points. The layup used in both configurations is $[90/0/90/45/-45]s[90/0]4s$, however the embodiment approach assumes that the additional cross-sectional area in the external radius is filled by 0-degree elements 904. A load 903 is distributed over the top nodes to simulate the vertical compression load, and the models are run to generate maximum and minimum hoop and shear strains. Strains between the two models are then compared to evaluate the relative structural efficiency of the two approaches. Because this is not a failure analysis and absolute strain will vary according to input load, this model approach is only useful to compare the relative strains between the two configurations for a given load. A lower relative strain for an equivalent load corresponds to an increased relative strength.

Figure 10:
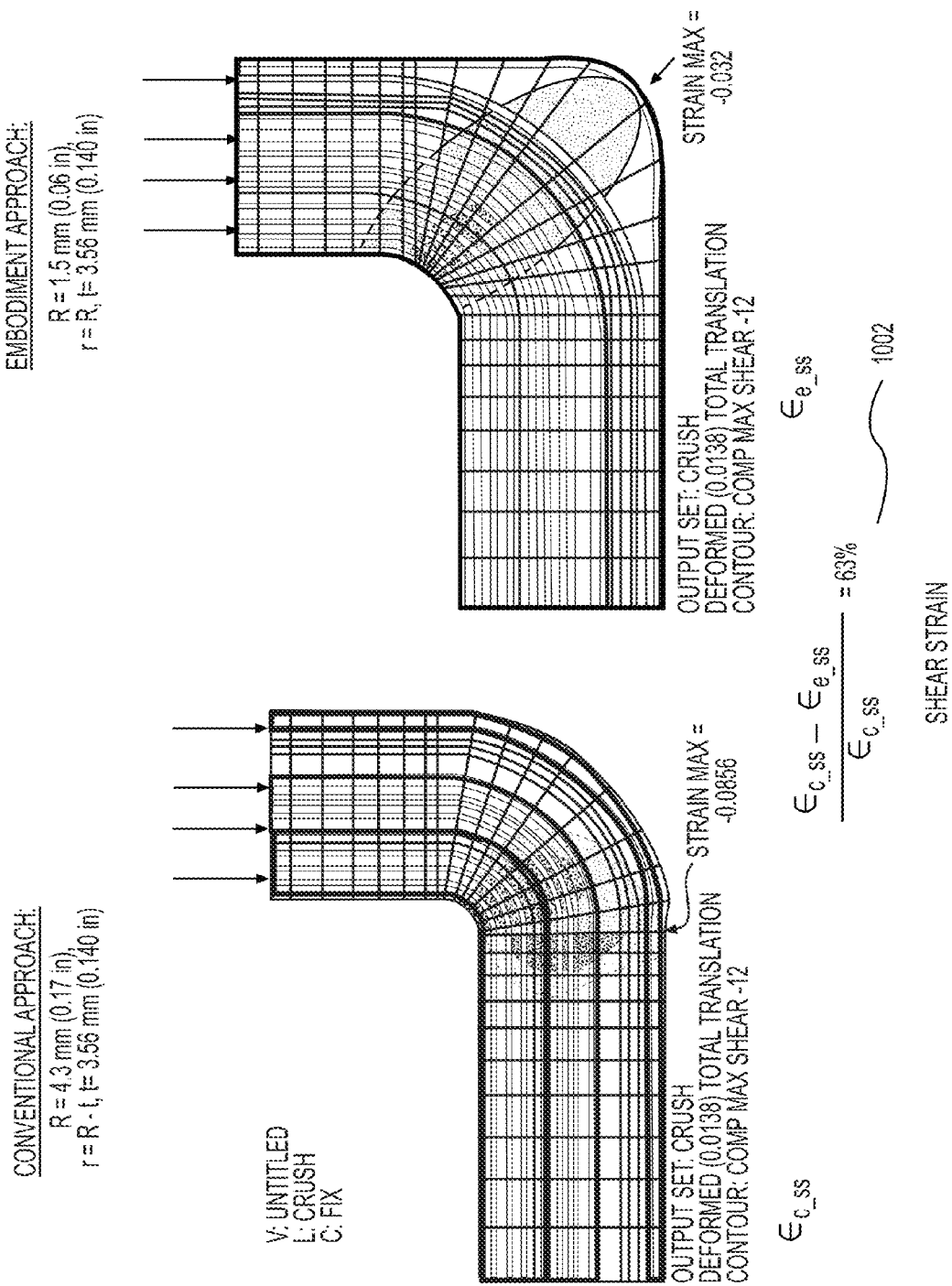
FIG. 10 includes several schematic plots of the calculated hoop strain and shear strain of the corners disclosed in FIG. 9. The figure also shows the calculations for the strain reduction associated with the variable-thickness corner embodiment.
Figure 11:
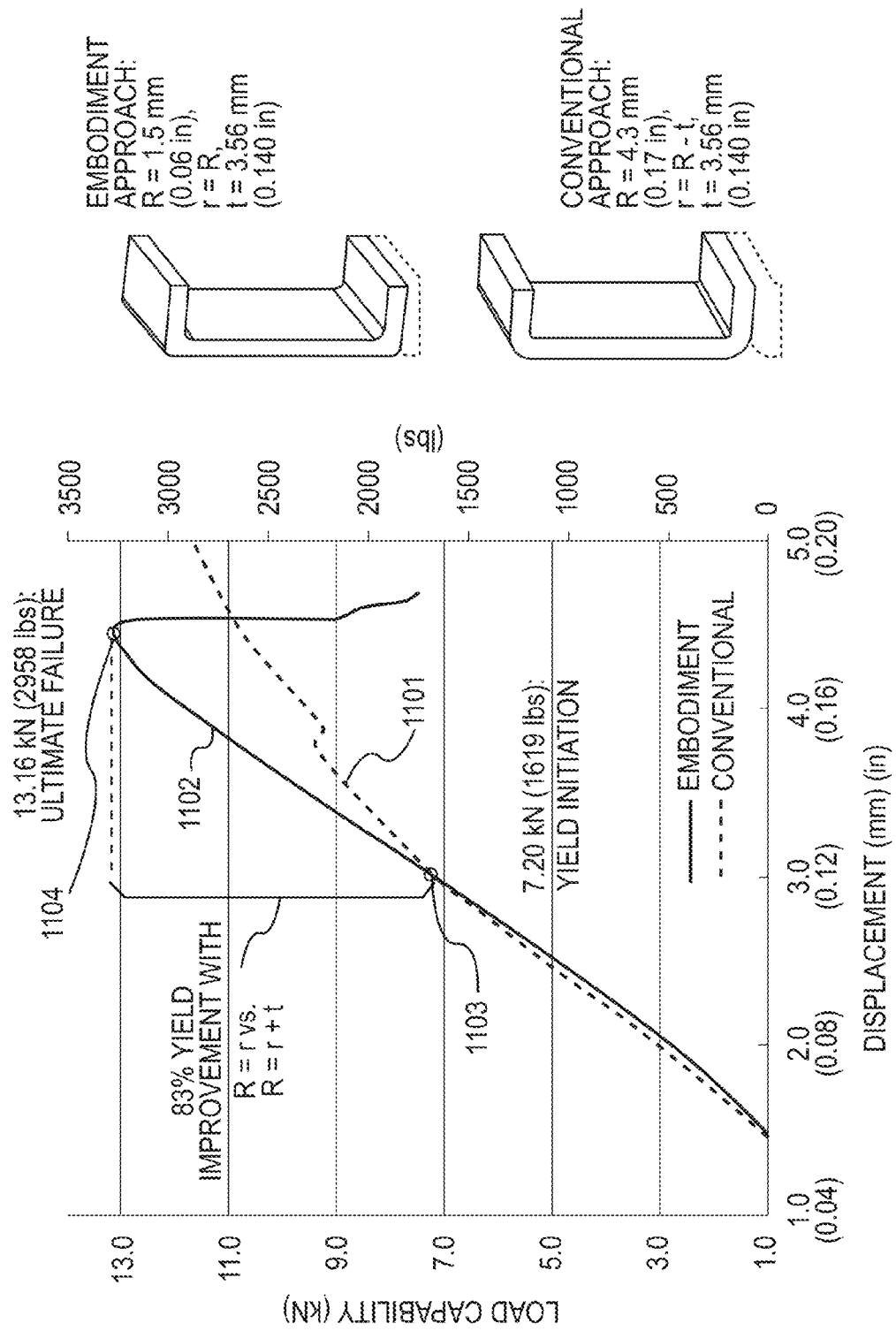
FIG. 11 is a graph of test data, indicating the load capability vs. platen displacement of two types of test elements according to the testing configuration depicted in FIG. 3: one type with c-channels including constant thickness corners, and the other with c-channels including variable thickness corners.

The FEM results for hoop and shear strain are depicted in FIG. 10. FEM analysis predicts 58% decrease in max hoop strain:

$(E_{c\_hs} - E_{ehs})/E_{c\_hs} = (0.0070 - 0.0029)/0.0070 = 58\%$   (indicated in FIG. 10 as equation 1001)

FEM analysis predicts 63% decrease in max shear strain:

$(E_{c\_ss} - E_{e\_ss})/E_{c\_ss} = (0.086 - 0.032)/0.086 = 63\%$   (indicated in FIG. 10 as equation 1002)

Figure 23:
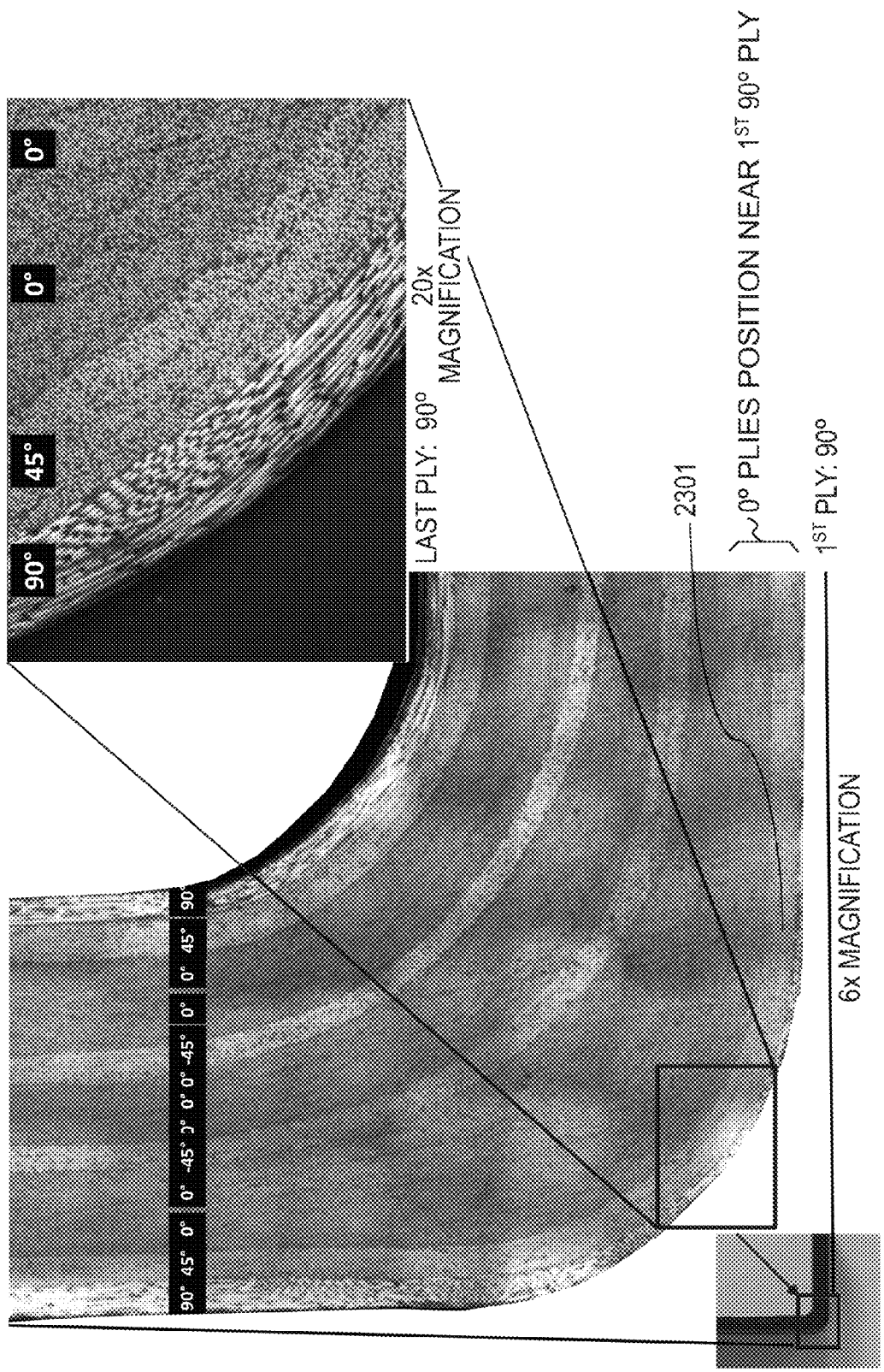
FIG. 23 is a micrograph image of a transverse section of a corner of an AS4/PEEK 13 ply stringer formed with equal internal and external radii of 1.5 mm (0.06 inches), according to an embodiment.
Figure 24:
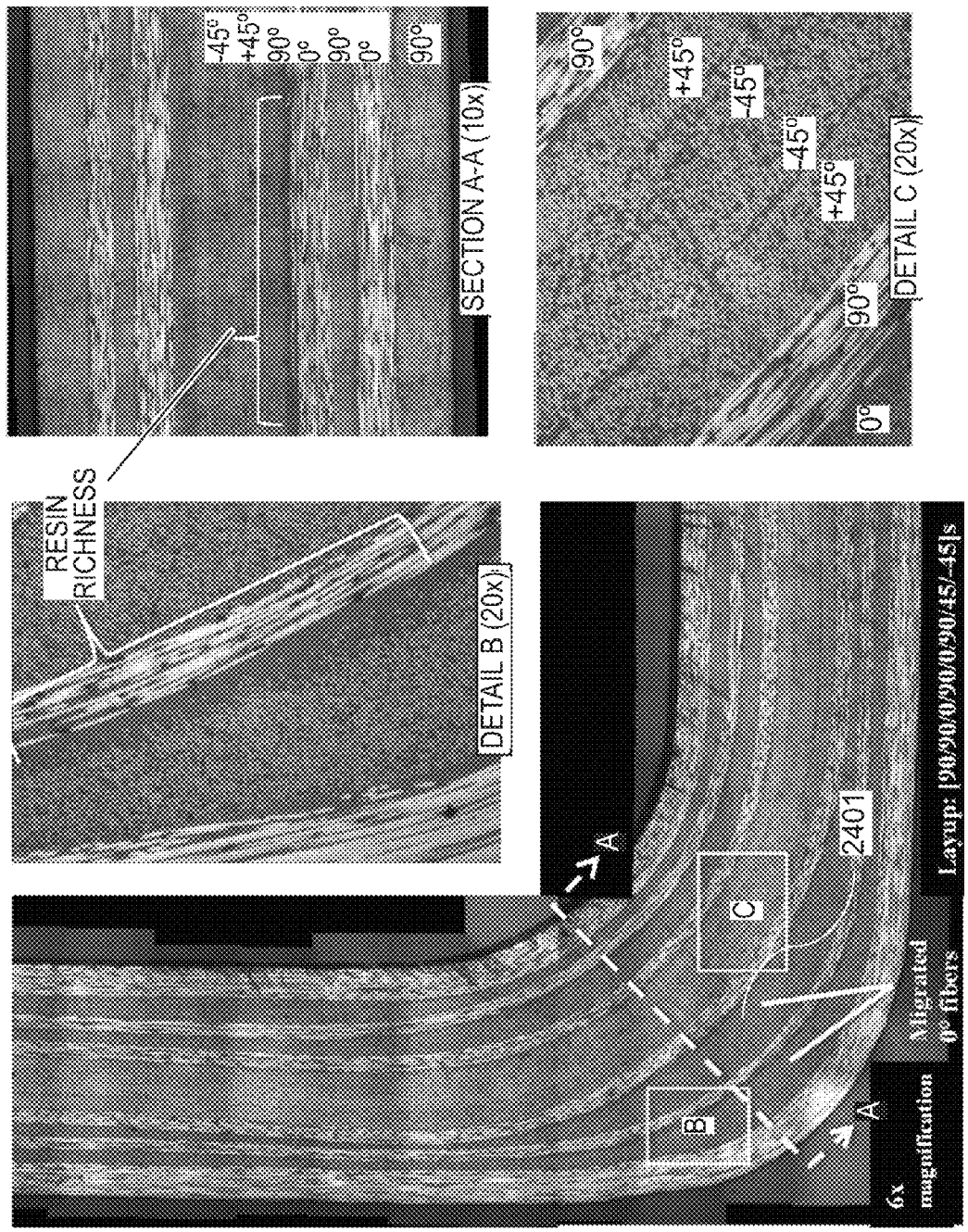
FIG. 24 is a micrograph image of a transverse section of the corner of a 16-ply stringer formed with equal internal and external radii of 2.5 mm (0.100 inches) as well as a micrograph image of a longitudinal section of the same corner according to an embodiment.

The approximately 60% decrease in strain through the variable thickness corner embodiment predicted by the FEM corresponds to an approximately 60% stronger radius configuration for vertical compression loads. Analysis is conservative due to clumping approximation of 0-degree plies in the corner of the variable thickness corner embodiment rather than distributed throughout the laminate as observed in micrographs of fabricated stringers, such as fabricated stringer 2301 and fabricated stringer 2401, which are seen in FIG. 23 and FIG. 24, respectively.

The same laminates analyzed by FEM were fabricated and tested to further substantiate the strength improvement. Multiple tests were performed on both configurations using a setup as represented in FIG. 3. The load vs. displacement curves of representative tests from each configuration are plotted together in FIG. 11. The 4.3 mm (0.17 inches) constant thickness corner stringer is represented by the dashed line 1101. This constant thickness corner stringer begins to yield at 7.20 kN (1619 lbs) (indicated in FIG. 11 as point 1103). The 1.5 mm (0.06 inches) variable thickness corner stringer is represented by the solid line 1102. This variable thickness corner stringer does not yield prior to ultimate failure at 13.16 kN (2958 lbs) (indicated in FIG. 11 as point 1104), over 80% higher than the constant thickness stringer. There is no ultimate strength improvement, which is a function of web thickness after the radius fully crushes.

Figure 12:
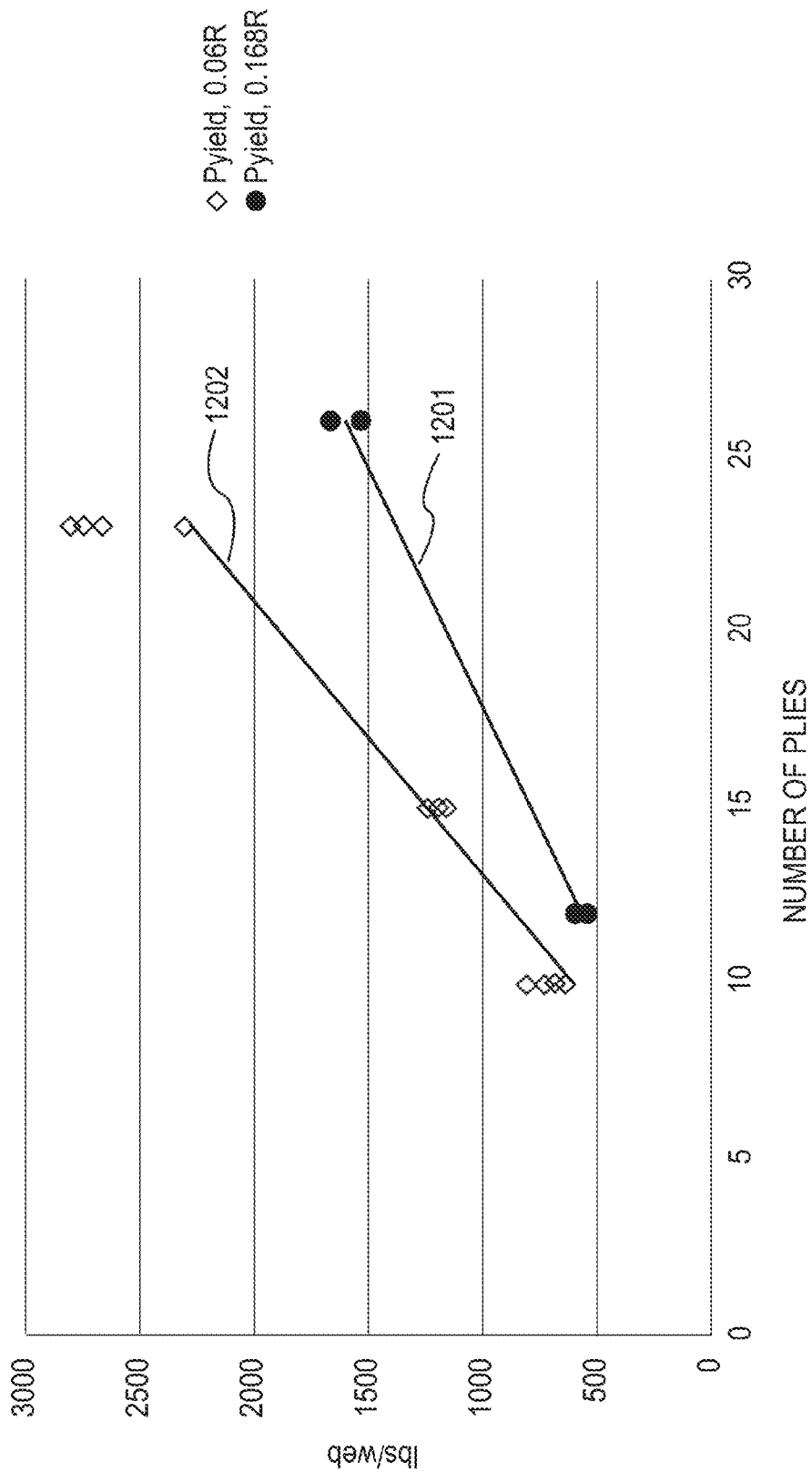
FIG. 12 is a graph of test data, plotting the strength capability vs. number of plies for stringers with different corner geometries.

FIG. 12 compares exemplary radius-crushing strength capability of stringers having constant thickness corners with those of embodiments having variable thickness corners for various composite thicknesses (i.e., number of constant thickness plies). A first embodiment of a stringer 1202 has a variable thickness corner with both the external and internal radii measuring approximately 0.06 inches. For comparison, a second stringer 1201 has a constant thickness corner with an external radius of approximately 0.168 inches and an internal radius that varies in size as a function of stringer thickness. Each ply is approximately 0.0054 inches thick. For a stringer thickness of 20 plies, stringer 1202 has a yield strength of approximately 80% higher than stringer 1201 for the same stringer thickness. In some cases, as the stringer thickness decreases, bending moment $M_e$ increases proportionally, as indicated by equation 911 of FIG. 9.

In addition to the radius-crushing strength improvement benefits of using embodiments with variable thickness corners, such embodiments may also provide other benefits. For example, embodiments using variable thickness corners may avoid the need for the knife-edge tooling required for a tight internal radius. As another example, long-term durability (fatigue) in variable thickness corners may be improved over corners with a tight internal radius. As still another example, the increased moment of inertia provided by corners of variable thickness makes the corresponding stringer more efficient in bending. It will be understood that these benefits are only intended to be exemplary and still further benefits are possible in utilizing embodiments with variable thickness corners over embodiments with constant thickness corners.

Exemplary Process

The fiber reinforced composite articles may use thermoplastic or thermoset polymer resin. The methods and systems for forming composite articles having variable thickness corners may involve controlling the migration of fibers and resin within a part in order to achieve thicker cross-sections in a bend or corner without having to use an excessive number of plies. Examples of such methods are discussed in detail below.

For purposes of description, the following embodiments discuss various directions and/or orientations of one or more plies comprising a tailored blank. These orientations and/or directions, often described in terms of angles relative to some part (or to other plies), are generally understood as characterizing the approximate direction or orientation of fibers comprising the composite plies. In other words, a ply oriented in a particular direction implies that the fibers of the ply (which may generally be parallel with one another) are approximately parallel with that same direction.

Figure 13A:
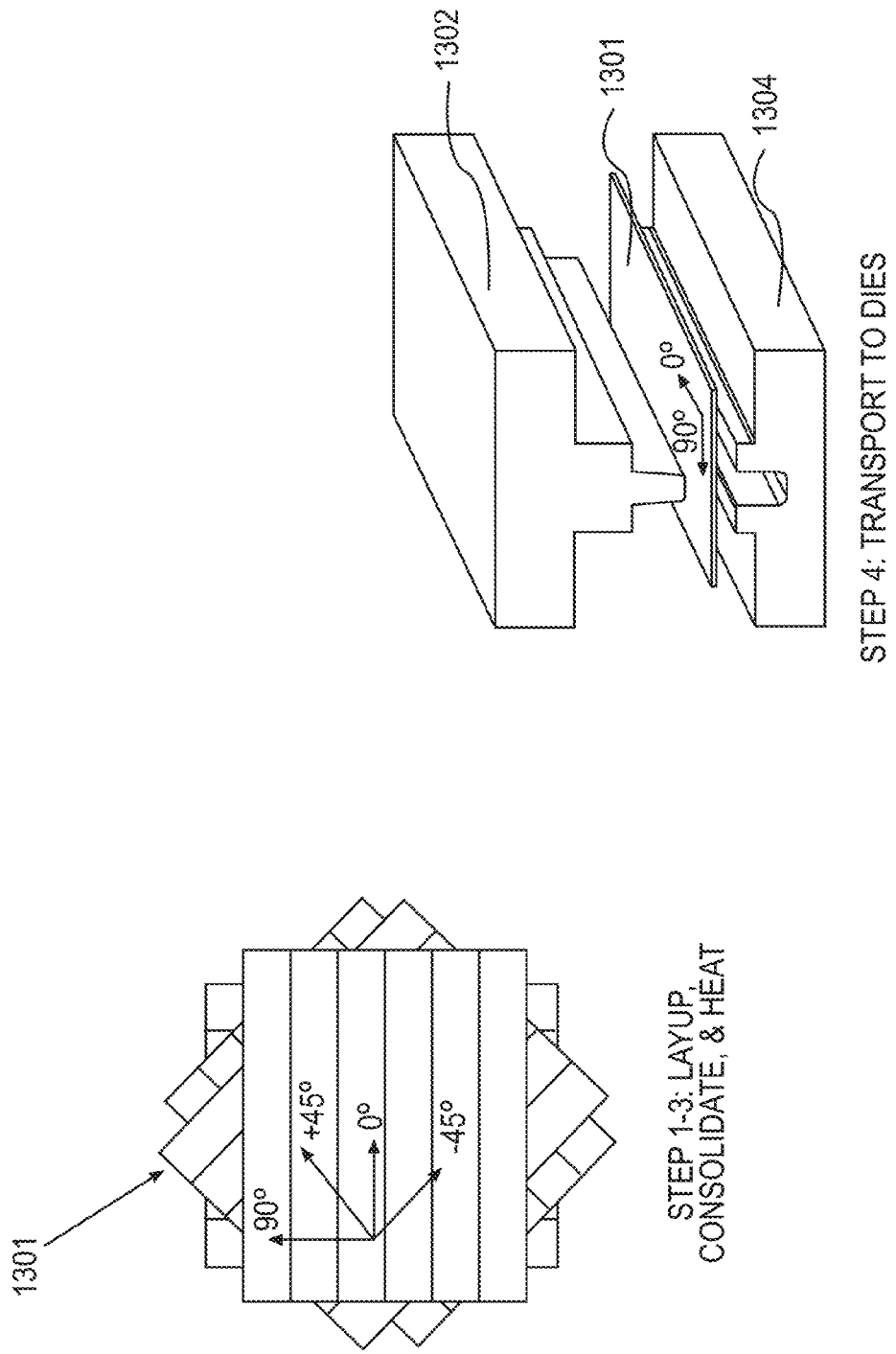
FIG. 13a is a schematic diagram illustrating steps of a stamp-forming process according to an embodiment, with a first diagram illustrating a top view of an embodiment of a tailored blank, and a second diagram illustrating a tailored blank positioned between the matched dies prior to forming.
Figure 13B:
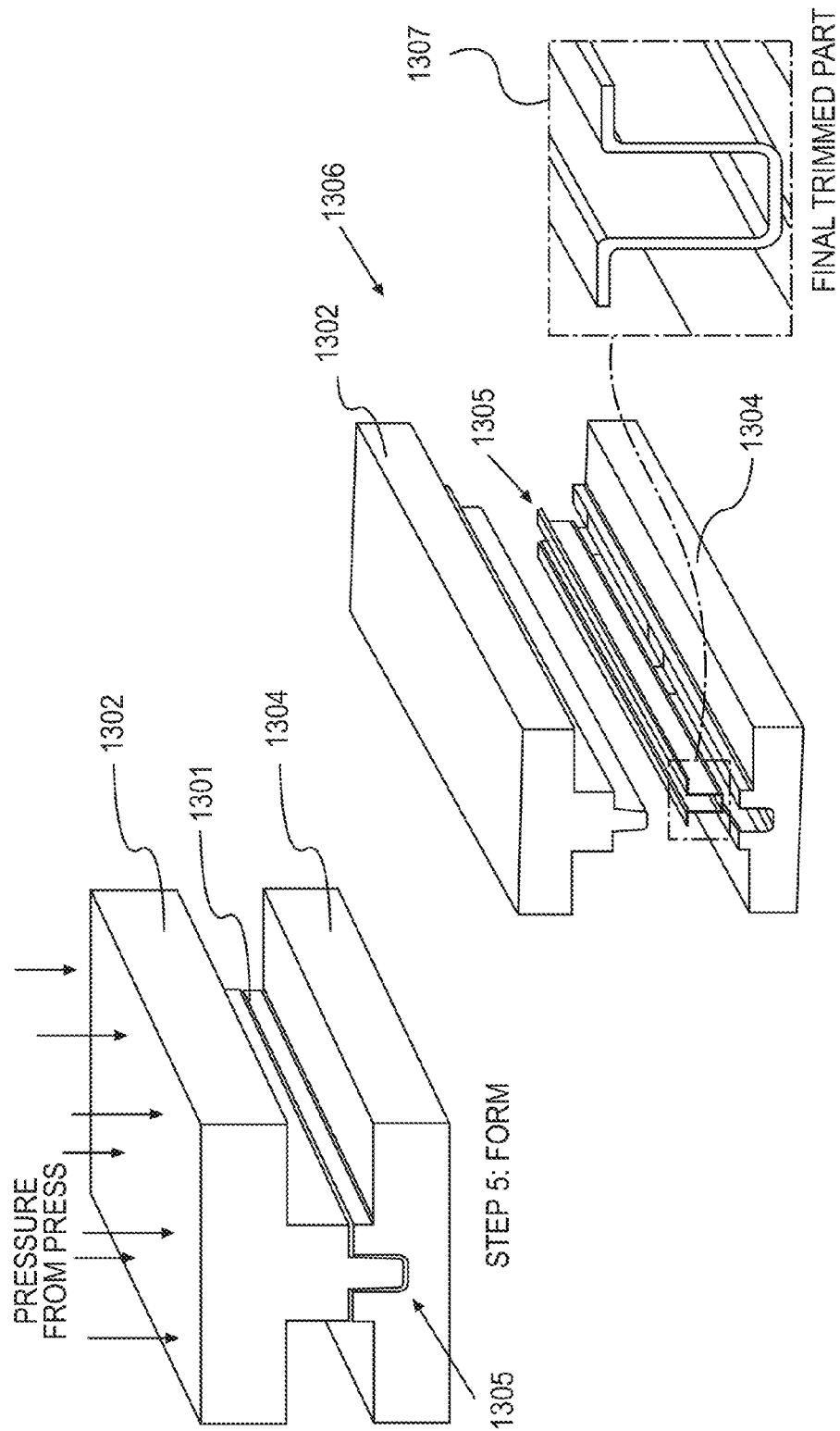
FIG. 13b is a schematic diagram illustrating subsequent steps of the stamp-forming process of FIG. 13a, with a first diagram illustrating a part after it has been stamp-formed between matching dies, and a second diagram illustrating the part after de-molding and trimming.

Embodiments of a thermoforming (a.k.a. "stamp forming") process are depicted in FIGS. 13*a* and 13*b* and may generally comprise the following steps: (1) Fabrication of the blank via hand or automated "layup" according to a predetermined stacking sequence; (2) Consolidation of the blank in a press, if required; (3) Heating of the consolidated blank; (4) If necessary, transporting the heated blank into a matched-metal mold; (5) Applying pressure; and (6) De-molding the part. Of course, the process described here is only intended to be exemplary and other embodiments could utilize different steps. Moreover, the steps described here could be carried out in a different order than the order in which the steps have been listed here.

As described above, conventional thermoforming processes are common in the industry for making parts with constant thickness corners. Some of the embodiments discussed here and shown in the figures may relate to improvements to the forming process, enabled by, for example, specifically designed ply stacking sequences, matched-metal tool designs, and adjustment of process parameters.

Further discussion of each of the steps described above is given here with reference to FIGS. 13*a* and 13*b*. In some embodiments, the process may begin with the layup of a "tailored blank," according to related U.S. Pat. No. 6,607,626, issued Aug. 19, 2003; U.S. Pat. No. 6,939,423, issued Sep. 6, 2005; U.S. Pat. No. 7,235,149, issued Jun. 26, 2007; U.S. Pat. No. 8,007,894, issued Aug. 20, 2011; U.S. Pat. No. 8,048,253, issued Nov. 1, 2011; and U.S. Pat. No. 8,168,029, issued May 2, 2012, all of which are herein incorporated by reference. In other embodiments, any other methods known in the art for laying up tailored blanks could be used. In the embodiment of FIG. 13*a*, the tailored blank 1301 may comprise multiple layers or "plies" of uni-directional thermoplastic material. In some cases, the part requirements may determine how many plies are laid-up to comprise the blank, as well as the direction of each ply. The total set of ply orientations of a given blank is called the "stacking sequence." In some embodiments, the approximate thickness of a ply may be in the range between 0.004 inches thick to 0.010 inches thick. However, in other embodiments, the approximate thickness of a ply could vary and may be less than 0.004 inches thick or greater than 0.010 inches thick. Moreover, in some embodiments, the number of plies comprising a blank may be in the range between 4 to 80 plies. In still other embodiments, however, the number of plies comprising a blank could be less than four, for example, two or three plies. In still other embodiments, the number of plies comprising a blank could exceed 80.

In some embodiments, a blank may be fabricated by laying down strips of uni-directional material onto a substantially flat tooling surface according to the width and length requirements of the part. In some cases, each ply may be held to the underlying ply by localized melting.

Following the laying up of a tailored blank, the layers (or plies) of tailored blank 1301 may be consolidated. In some cases, consolidation may begin by inserting tailored blank 1301 into a press (not shown). In some cases, the temperature of the blank may be brought up to the material process temperature under pressure. Depending on material type and thickness, the temperature for consolidation may range from 350° F. to 800° F., and duration at temperature may range from 5 minutes to 40 minutes, though in other embodiments the temperature and duration could be selected to have any other values. For example, AS4/PEEK may be processed for 20 minutes at 780° F. Under heat and pressure, most voids and porosity between ply layers may be evacuated from the blank. The blank may then be removed from the heated press and cooled under pressure. In some cases, it may not be necessary to consolidate the blank prior to forming. In other words, consolidation may be an optional step in the forming process.

After consolidation, in some embodiments, the tailored blank 1301 may be heated to its processing temperature. This heating may be accomplished by a number of methods, such as infrared heating in an oven, convection, direct conduction heating by a heated tool or element, or other suitable methods. In some cases, the heating process temperature may be approximately the same as for consolidation, but unpressurized and for a shorter duration. For example, a 0.080 inch thick AS4/PEEK consolidated tailored blank may be heated in an IR oven to 780° F. in 5 minutes. However, any other heating temperatures and durations could be used in other embodiments.

After consolidation and heating, tailored blank 1301 (which may now be in a consolidated form) may be transported to a set of corresponding dies. In the embodiment shown in FIG. 13a, blank 1301 may be placed between first forming die 1302 and second forming die 1304. In some cases, the transportation time may be generally very short as the material tends to cool quickly once it is removed from the heating source. In different embodiments, the transportation time may range from a fraction of a second to approximately 20 seconds, depending on equipment, capability, and part processing requirements. For example, an AS4/PEEK consolidated blank may be transported from an IR oven at its processing temperature to the forming dies in approximately 2 to 3 seconds and be optimally formed.

In embodiments in which a blank has been heated by direct conduction from the forming dies, this transportation step may not be necessary. In such an embodiment, the forming dies may be heated to the part processing temperature, which allows the dies to heat the part via conduction. Once the part reaches processing temp, it may be formed to its final shape as described below.

As seen in FIG. 13b, the 2D heated blank 1301 may be formed by first forming die 1302 and second forming die 1304 into the final 3D configuration 1305. In some cases, the part may remain under specific heat and pressure settings for a predetermined time period while the thermoplastic matrix cools and solidifies. In some cases, the temperature of the matched dies 1302 and 1304 may be controlled to achieve the proper degree of crystallinity, and may vary by material type and desired mechanical properties. In some embodiments, the tool (or die) temperature may range from 120° F. to 430° F. For example, a tool temp of 430° F. for AS4/PEEK parts may yield optimal mechanical properties for many structural applications. It will be understood that in applying heat to a part during this process, both the first forming die 1302 and/or the second forming die 1304 may be used for heating.

In some embodiments, the forming pressure applied by the press to the part may be selected to achieve low void content and to enable migration of material into the corner. In some cases, forming pressures may range from 50 psi to 4000 psi, and could be selected according to part thickness, material type, and/or mold geometry. For example, a forming pressure of 1000 psi for an AS4/PEEK laminate of 0.080 in thickness may result in low void content and optimal forming.

In some embodiments, the minimum duration for which pressure is maintained on the part may be set by the time it takes to cool the part at the desired cooling rate to a temperature at which it is safe to remove the part. In some cases, the temperature at which pressure may be released may be well below the matrix melt temperature, but may be above the material Tg, or glass transition temperature. Other factors affecting the duration can include part thickness and initial temperature of the matched dies. In some cases, the duration of pressure application may range from less than one minute to 20 minutes. For example, an AS4/PEEK part of 0.080 in thickness will cool from its process temperature of 780° F. to a safe temperature for release of pressure in less than 2 minutes if the dies 1302 and 1304 are heated to 430° F. After releasing the pressure applied by the press, first forming die 1302 may be lifted and the formed part may then be demolded for trimming as most clearly seen in enlarged region 1307 of blank 1305.

Generally, materials for one or more forming dies used in the process can vary from one embodiment to another. In some embodiments, one or more forming dies may be made of a metal or metal alloy. Furthermore, some embodiments may utilize coatings or outer layers with one or more of the forming dies to facilitate the forming process. In some embodiments, for example, one or more of the forming dies (for example a female die relative to the variable thickness corner) may be coated or plated with a low dynamic-friction and non-stick coating or lubricant. One example of such a material is a three-coat system, with the primer and mid-coats including blended combinations of resins and ceramic reinforcements for durability, and with a top coating rich in PTFE fluoropolymers, dedicated to "release" (the nonstick characteristic). Other examples of such coatings include, but are not limited to: other fluoropolymers (such as TEFLON®), molybdenum disulfide (MoS2), tungsten disulfide (WS2), graphite, alumina oxide, and silicone.

Figure 14:
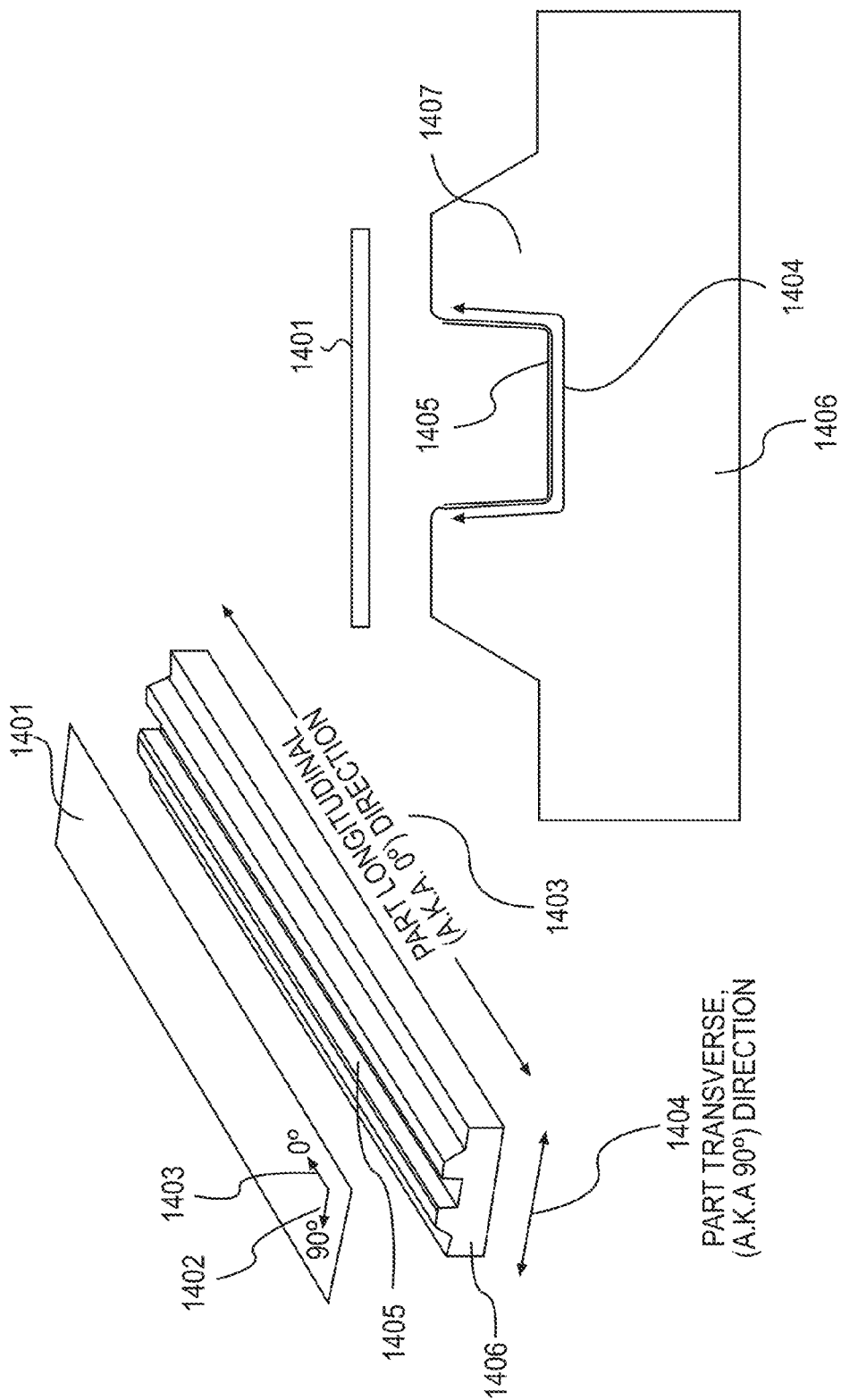
FIG. 14 is a schematic diagram illustrating the 0-degree and 90-degree fiber orientation convention relative to a forming tool for exemplary tailored blank positioned for forming, and for a formed c-channel stringer in the mold. Isometric and end-on views are illustrated.

FIG. 14 illustrates a schematic isometric and schematic front view of an exemplary blank 1401 that is positioned above a lower forming die 1406. For purposes of illustration, a resulting c-channel stringer 1405 is shown simultaneously with blank 1401 and is disposed within lower forming die 1406.

For purposes of convenience and clarity, a blank used for composite laminate articles may be characterized with reference to particular directions. For example, the 0-degree direction of blank 1401 is a direction extending in parallel with longitudinal direction 1403 of blank 1401 (and likewise of lower forming die 1406). Also, the 90-degree direction of blank 1401 is a direction that is perpendicular to the longitudinal (or 0-degree) direction. The 90-degree direction may also be referred to as the transverse direction.

Figure 15:
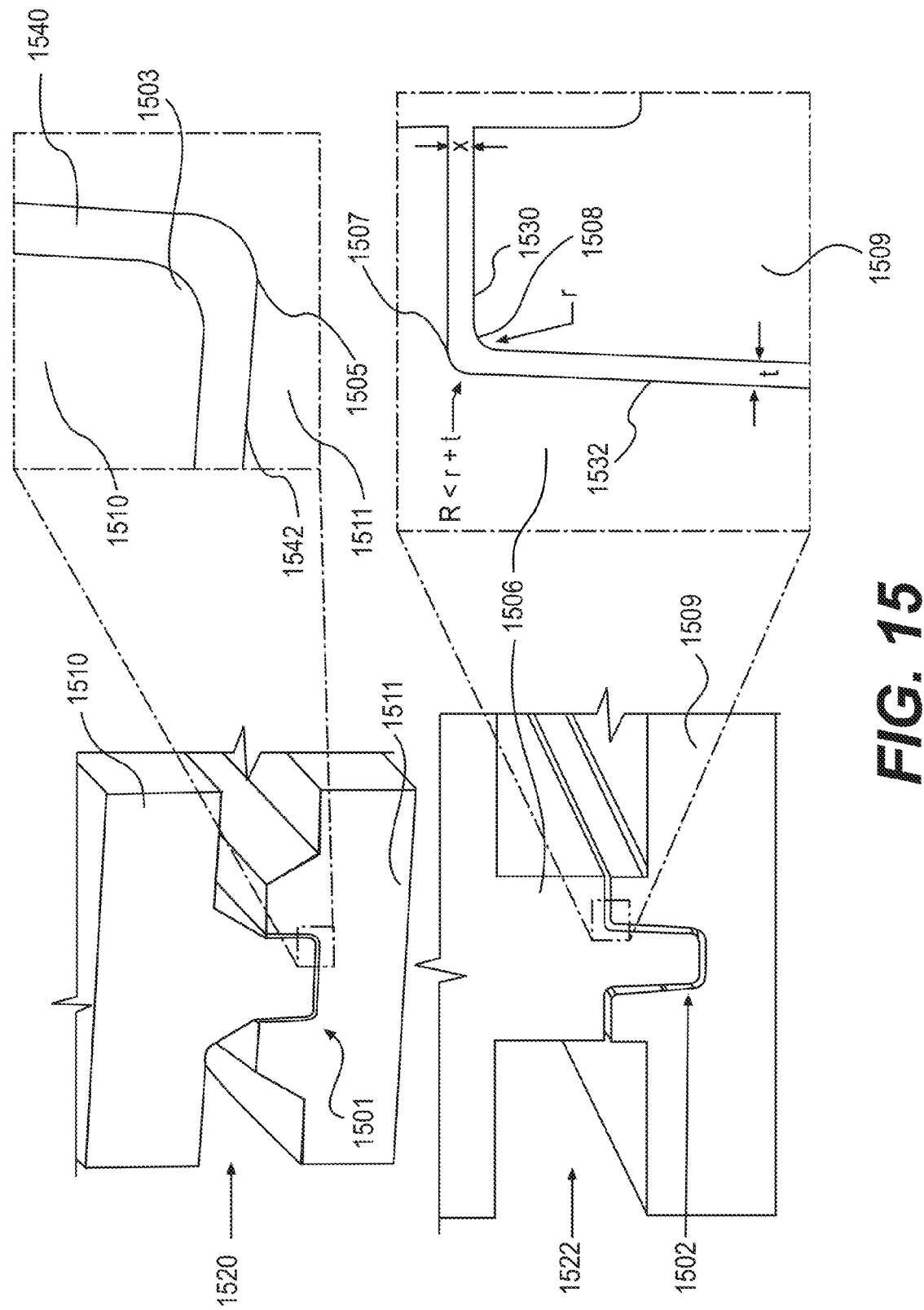
FIG. 15 is a schematic diagram illustrating various portions of embodiments of a die and embodiments of plies.

FIG. 15 illustrates embodiments of different part types and corresponding dies for forming each part. Referring to FIG. 15, a first set of dies 1520 and a second set of dies 1522 may be configured for use in forming c-channel type stringer 1501 and hat-shaped stringer 1502, respectively. In describing the dies, the terms "convex" and "concave" are used in place of the more conventional "male" and "female" terms in order to maintain the same convention regardless of the type of part. For example, a "male" die for a c-channel type part contains a "convex" surface that interfaces with the c-channel internal radius. On the contrary, a "female" die for a hat-section-type part contains the "convex" surface which interfaces with the hat-section internal radius. In the embodiments of FIG. 15, the corners associated with convex tools 1509 and 1510 produce the internal radius and interface with the "inside ply" of hat-shaped stringer 1502 and c-channel stringer 1501, respectively. Likewise, the concave tool corners 1506 and 1511 produce the external radius and interface with the "outside ply" of hat-shaped stringer 1502 and c-channel stringer 1501, respectively.

During the forming process, the material may be controlled such that 0-degree fibers and resin migrate into the corner of interest from either the stringer flange 1530 or web 1532 for hat-shaped stringer 1502 and either stringer flange 1542 or web 1540 for c-channel stringer 1501. This method may apply to multiple cross-section types and their respective tools, including types other than the c-channel stringer 1501 or hat-shaped stringer 1502 illustrated in FIG. 15. As indicated in the enlarged view of a section of hat-shaped stringer 1502 and the corresponding set of dies 1522, the geometry of inner radius 1508 and outer radius 1507 may correspond to the radii of the corresponding corners of concave tool 1506 and convex tool 1509, respectively. In some embodiments, the tool radius that generates outer radius 1507 may be substantially less than the tool radius that generates inner radius 1508 plus the thickness t of the laminate. Similarly, as indicated in the enlarged view of a section of c-channel stringer 1501 and the corresponding set of dies 1520, the geometry of inner radius 1503 and outer radius 1505 may correspond to the radii of the corresponding corners of concave tool 1511 and convex tool 1510, respectively. In some embodiments, the tool radius that generates outer radius 1505 may be substantially less than the tool radius that generates inner radius 1503 plus the thickness of the laminate. To migrate the material from the flange or web into the corner, the tool is designed with unique features and coatings as described herein.

Figure 16:
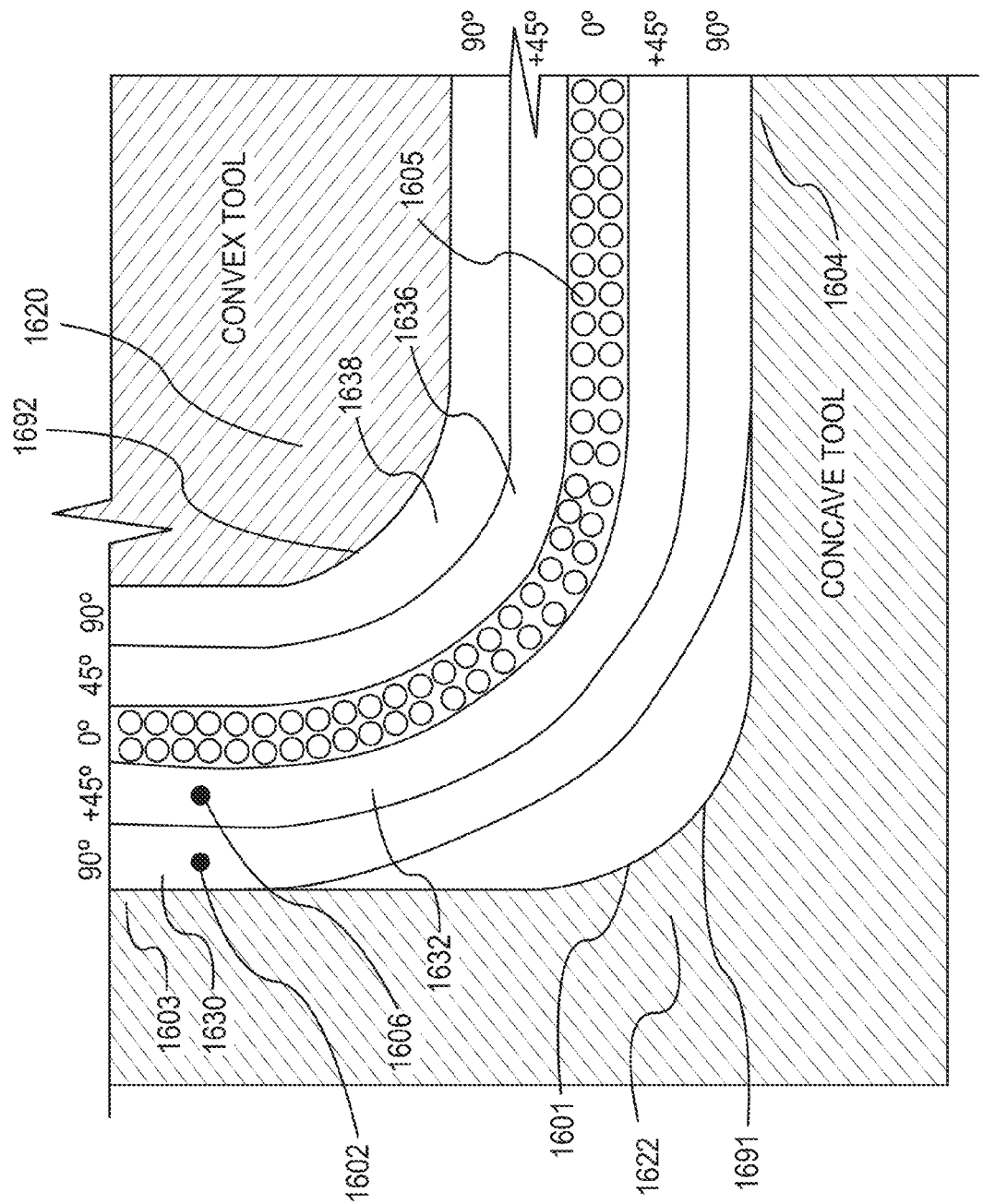
FIG. 16 is a schematic diagram illustrating a conceptual not-to-scale 5-ply laminate of constant thickness, located between concave and convex forming tools. The gap between the forming tools is variable thickness according to an embodiment. The part is illustrated in the nominal state prior to migration.

With the key terms defined, an exemplary method of migrating the material into the corner to achieve a variable thickness corner can be described. FIG. 16 depicts a conceptual not-to-scale 5-ply laminate of constant thickness between a concave tool portion 1622 and a convex tool portion 1620 in the nominal state prior to migration. In this example, the internal radius 1691 of concave tool portion 1622 is substantially equal to the external radius 1692 of convex tool portion 1620, creating a void condition in the corner area 1601. The embodiments described here provide an exemplary method for filling the corner area 1601 in order to achieve various strength improvements. In the embodiments described here, the nominal tool configuration defines a formed part that is more than 30% thicker at the radius than the nominal tailored blank. In order to produce the final part according to the tooled configuration without bridging at the external radius, material may be supplied to fill the voided corner area 1601. More specifically, in some cases, material may be supplied without the use of additional filler material that is added separately from the tailored blank.

Figure 17:
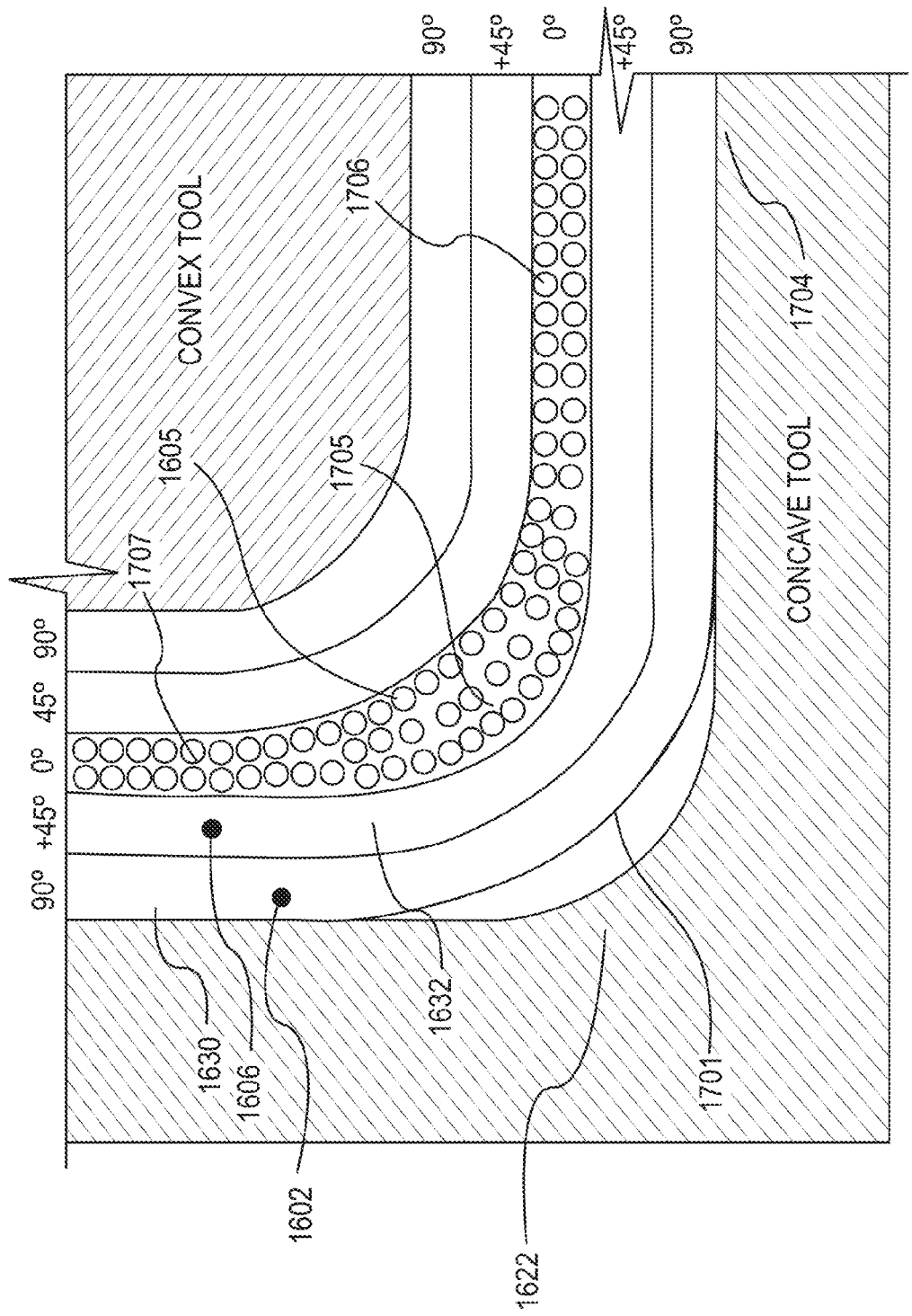
FIG. 17 is a schematic diagram similar in some respects to FIG. 16, but illustrating the change in the laminate after the initiation of material migration into the vacant corner.
Figure 18:
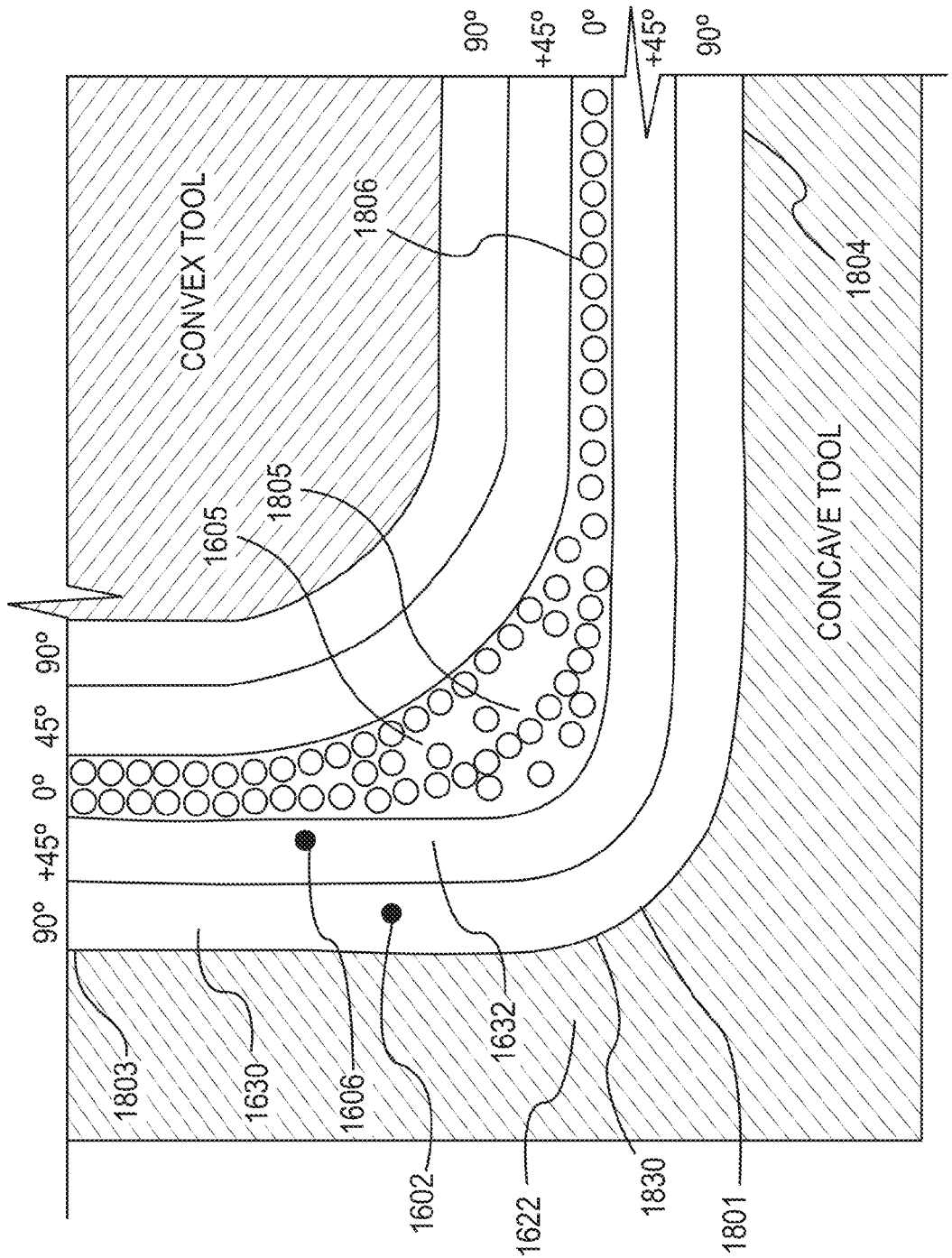
FIG. 18 is a schematic diagram similar in some respects to FIGS. 16 and 17, but illustrating the laminate after completion of material migration into the vacant corner.

The configuration described here and shown in FIGS. 16 through 18 includes five plies: first ply 1630, second ply 1632, third ply 1605, fourth ply 1636 and fifth ply 1638. Moreover, first ply 1630 confronts concave tool 1622, while fifth ply 1638 confronts convex tool 1620. Moreover, first ply 1630 and fifth ply 1638 may be seen to sandwich the remaining three plies, so that first ply 1630 and fifth ply 1638 may be characterized as outer plies, while second ply 1632, third ply 1605 and fourth ply 1636 may be characterized as inner, or interior, plies. Furthermore, as indicated in FIGS. 16 through 18, each ply may be associated with a particular orientation, corresponding to the orientation of the fibers in the ply. Namely, first ply 1630, second ply 1632, third ply 1605, fourth ply 1636 and fifth ply 1638 may be characterized by their angular orientation relative to a longitudinal direction of convex tool 1620 and concave tool 1622: first ply 1630 is a 90-degree ply, second ply 1632 is a 45-degree ply, third ply 1605 is a 0-degree ply, fourth ply 1636 is another 45-degree ply and fifth ply 1638 is another 90-degree ply.

In some embodiments, migration of material into the corner area 1601 may be accomplished through careful tailoring of the laminates and details of tooling design explained herein. FIG. 16 to FIG. 18 illustrate the progressive filling of corner area 1601 at different stages of the migration interval according to an embodiment. In some embodiments, there may be a least two primary sources of material to fill area 1601, including: 1) a 90-degree ply material from outside the mold, and 2) migrating resin and 0-degree fibers from within the part. These two physical mechanisms are described below.

An embodiment in which migration of a 90-degree material that fills the void against the surface of concave tool 1622 is illustrated in progressive stages in FIG. 16 to FIG. 18. For purposes of clarity, only a portion of convex tool 1620, concave tool 1622 and the plies discussed here are shown. In particular, FIGS. 16 through 18 are cut-off cross-sectional views in which it should be understood that tooling and plies may extend outside of the illustrated region.

For purposes of illustration, first ply 1630 is marked with point 1602, and second ply 1632, which is disposed adjacent (and inwardly) to first ply 1630, is marked with point 1606, where point 1602 and point 1606 correspond to representative fixed points on the respective plies. In some cases, first ply 1630 may be oriented transversely with respect to a longitudinal direction of one or more dies in order to withstand the tangential tensile forces without coming apart during forming.

Prior to migration, point 1602 and point 1606 are located in their original positions. Midway through migration, which is shown in FIG. 17, first ply 1630 and second ply 1632 have pulled new material into the part, indicated by the translation of the point 1602 and the point 1608 down the wall of concave tool 1622. Post migration, which is shown in FIG. 18, first ply 1630 may conform completely to the surface of concave tool 1622, and the full extent of the new material pulled into the part by first ply 1630 and second ply 1632 is indicated by point 1602 and point 1606, respectively. The movement of these plies begins as the molten laminate begins to experience pressure forces from the cavity and core, generating an internal pressure inside the laminate.

Figure 19:
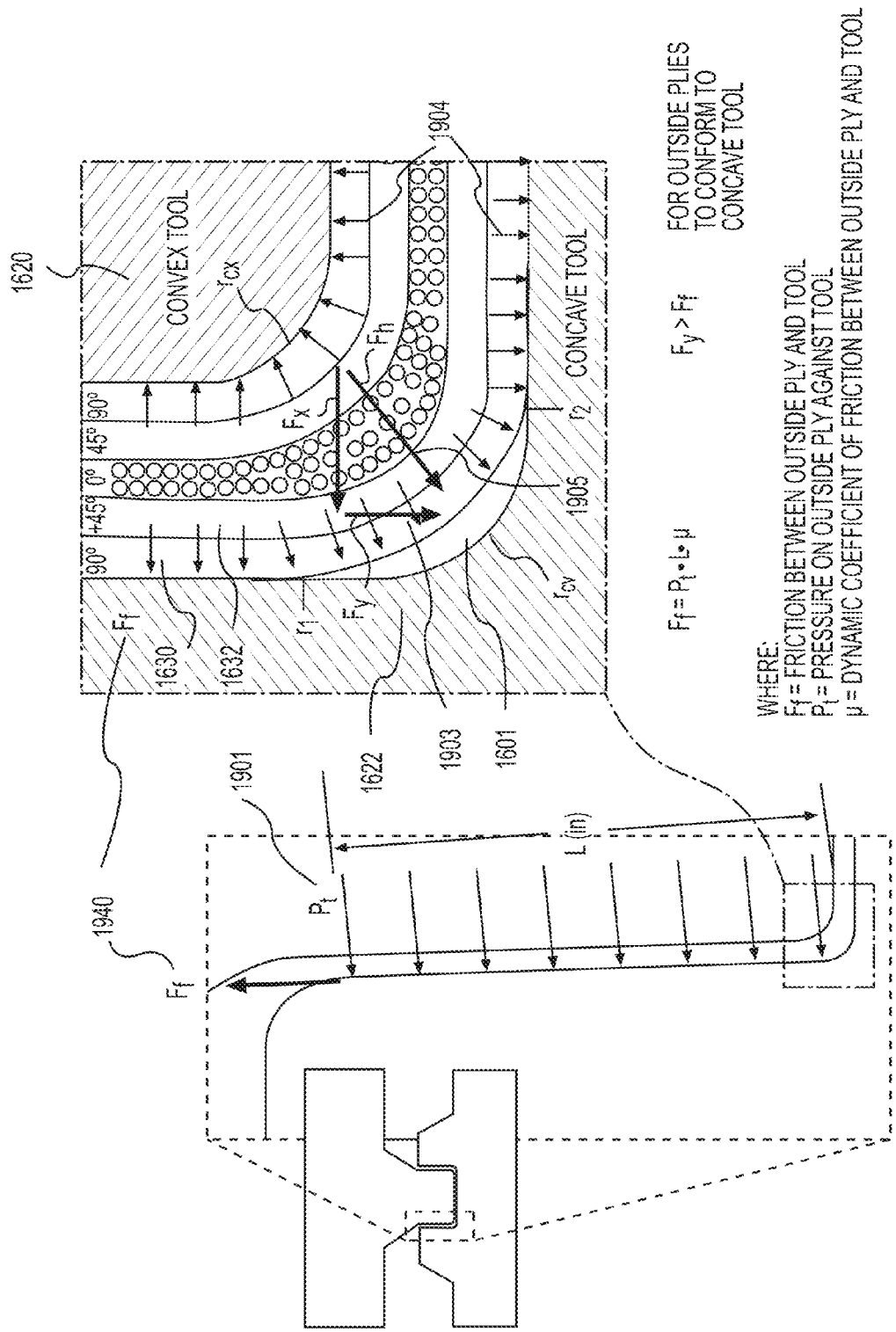
FIG. 19 is a force diagram illustrating the frictional and pressure forces acting within the laminate and resulting in the migration of material into the corner, according to an embodiment.

Referring now to FIG. 19, while the matrix remains above its melt temperature it behaves hydrostatically. The hydrostatic pressure 1904 acts radially into the vacant corner area 1601. Resultant force 1905 ($F_h$) comes about from the hydrostatic pressure 1904 acting over the vacant corner area 1601. The vertical component 1903 ($F_y$) of the resultant force 1905 acts to pull outer ply 1630 down into the vacant corner area 1601. At the same time, the pressure from the draft of the convex tool portion 1620 pushes the part against the wall of the concave tool portion 1622 with a pressure 1901. The pressure creates a frictional force 1940 ($F_f$), equal to:

$$F_f = P_t \cdot L \cdot \mu$$

Where:

$F_f$=Friction between outer ply and forming die (or tool)

$P_t$=Pressure acting on outer ply against the forming die (or tool) surface $\mu$=dynamic coefficient of friction between outer ply and forming die (or tool)

When vertical component 1903 exceeds frictional force 1940 (Ff), the tangential force overcomes the frictional force and outer ply 1630 conforms to concave tool portion 1622. General ranges for configurations that enable the flow of material into the corner are:

Part pressure>500 psi

L<~20*t $r_{cv} \approx r_{cx}$:

and $\mu$<0.10

A $\mu$ of less than 0.10 is achieved by coating or plating the concave tool surface with a low dynamic-friction and non-stick coating or lubricant. Examples include, but are not limited to: PTFE, molybdenum disulfide (MoS2), tungsten disulfide (WS2), graphite, alumina oxide, and silicone.

Since the migration time window is very short, full pressure may be applied to the complete laminate as quickly as possible after the part is brought up to its processing temperature. In some cases, the part must remain above the melt temperature during the intermediate stages of transport from the heating source, the beginning of pressure up, and the application of full pressure, in order to enable migration. For example, an AS4/PEEK consolidated blank of 0.080 inches thickness is heated to 840° F. The blank is transported to matched metal dies after 2 seconds have elapsed. The moving die, heated to 430° F., makes contact with the blank after 3.5 seconds of total elapsed time. The press pressures up at 1 mm/s, such that the part is under full pressure after 6 seconds of total elapsed time.

This transverse (approximately 90-degree) material accounts for some but not all of the material needed to fill the corner. The exact percentage is determined by the tooling radii in the corner and the layup. The remainder of the material originates in the flanges and web, and is migrated as molten flow by the same hydrostatic forces 1904. In some embodiments, approximately 50% of this migrated material may be resin, while the other 50% may be 0-degree fibers moving freely with the resin. In some cases, flow of 45-degree fibers within the laminate may be very limited. In some cases, substantially no flow of 90-degree fibers may be observed.

FIGS. 16 to FIG. 18 illustrate the progressive stages of migration of 0-degree plies and resin into the corner. Prior to migration, an exemplary third ply 1605 (which is a 0-degree ply) has an approximately constant thickness throughout the corner. As the surface 1692 of convex tool portion 1620 pressures against the c-channel web and the surface 1691 of concave tool 1622, fibers in the third ply at region 1706 begin to migrate to region 1705, as shown in FIG. 17. The third ply 1605 has a thickness at region 1707 that remains largely unchanged in this example due to the shallow tool draft angle. Post-forming, as seen in FIG. 18, the third ply 1605 has continued to migrate to region 1805. In particular, some fibers of third ply 1605 along with a considerable amount of resin have migrated into region 1805. At region 1805, the thickness of third ply 1605 has increased such that the thickness of third ply 1605 is maximized in this region. Meanwhile, in some cases, the c-channel web 1804 has thinned relative to the flange 1803 to accommodate the migration. The example illustrated in FIG. 19 effectively produces a 0.080 inches thick AS4/PEEK c-channel with $r_{cv}=r_{cx}=0.06$ inches, L=1.8 inches, and is typically formed at approximately 1000 psi part pressure. Moreover, in this example, the tool has a ceramic/fluoropolymer coating with $\mu \approx 0.07$.

As indicated in FIGS. 16 through 18, this method allows for various plies to be pulled from outside the part in order for these plies to conform to the surface of concave tool portion 1622. Thus, for example, while the approximate thickness of first ply 1630 and second ply 1632 remains substantially constant during the process, first ply 1630 and second ply 1632 are both pulled into corner area 1601 and reshaped to conform to the approximate shape of interior surface 1830 of concave tool portion 1622 (see FIG. 18).

While FIGS. 16 through 18 illustrate a particular embodiment of a method for forming a variable thickness corner, the general principles described here may be applied to various other embodiments, including other possible arrangements of tailored blanks. Generally, the exemplary process enables migration of laminate material (resin and fibers) towards a corner of a formed part by utilizing the configuration described above, which includes at least a transverse outer ply and an inner approximately 0-degree ply. The generally transverse outer ply may initially have some volume extending out of the dies, but this volume may be pulled into the die cavities to conform to the shape of the concave die. In addition, the approximately 0-degree ply has fibers aligned with a longitudinal direction of the dies (and die cavities), which allows the fibers (and surrounding resin) to migrate towards the corner as well. Moreover, various features of some embodiments of the design, including die shapes, various die coatings (non-stick, etc.), hydrostatic pressure, heat as well as possibly other features further enable the reshaping of the outer ply and the migration of material in the 0-degree ply towards the corner.

It will be understood that the embodiment illustrated in FIGS. 16 through 18 is only intended to be exemplary. In particular, while the embodiment comprises a 5-ply blank, other embodiments could use any other layup configuration, including any number of plies in a variety of different orientations. In some embodiments, for example, a tailored blank may comprise multiple (two or more) 0-degree plies, each of which may be configured to migrate towards a corner during the corner forming process. In such cases, the 0-degree plies could be disposed directly adjacent to one another (i.e., they may be in direct contact with one another) or they could be separated by one or more intermediate plies of different orientations.

Figure 20:
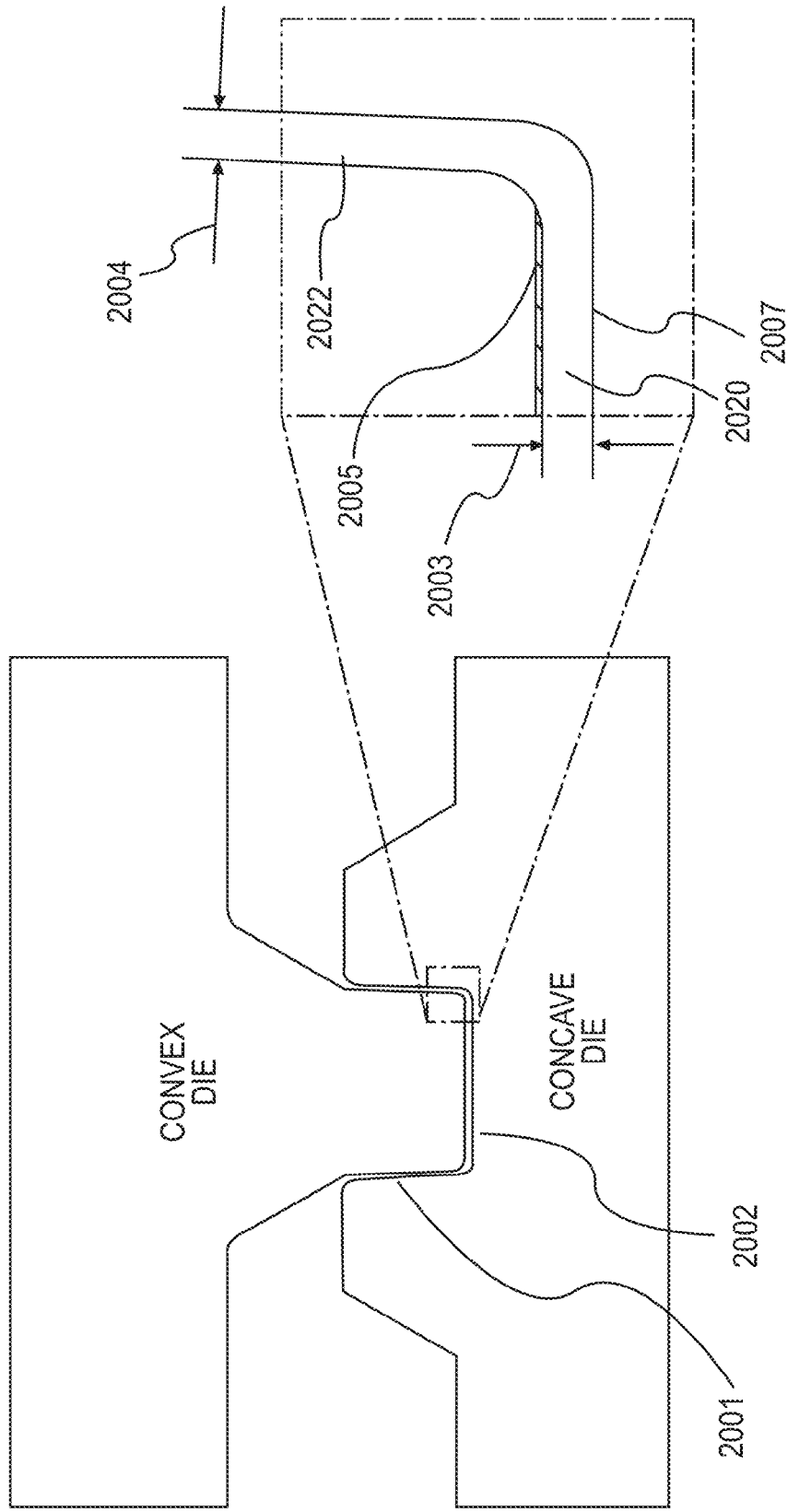
FIG. 20 is a schematic diagram illustrating the end view of a c-channel convex and concave die in the closed position, as well as a detail of the corner according to an embodiment.

FIG. 20 illustrates an embodiment in which a small surface offset adjustment is made to an exemplary c-channel tool in order to enable 0-deg fibers and resin of a 0-degree ply to freely migrate into the corner. In this example, the convex tool surface 2005 is extended towards the concave tool surface 2007 by approximately 2% of the part thickness. This creates a mismatch: the distance 2003 between the concave tool surface 2005 and convex tool surface 2007 (also referred to as the hard tooled gap) in the area of the web 2020 is approximately 2% less than the distance 2004 between the two tools in the area of the flange 2022 (i.e. distance 2003 may be about 98% of the value of distance 2004). In other words, the size (or thickness) of the hard-tooled gap on one side (web side) of the variable-thickness corner is less than the size (or thickness) of the hard-tooled gap on the other side (flange side). The exact offset, varying between 0.05 to 4%, varies based on corner geometry, web length, and how much material is required to flow into the corner. Implementing this small offset ensures sufficient pressure against the web to migrate material into the corner.

FIG. 23 shows a micrograph of the corner of a 13-ply stringer formed with equal internal and external radii of 1.5 mm (0.06 inches). There is no notable porosity and no voids. The 0-degree plies on the outer mold line (OML) side migrate into the corner along with resin to fill the voids, corresponding to a thinning of the webs and flanges.

This stringer geometry is a reasonable compromise for inspection, producibility, and radius crushing strength improvement.

FIG. 24 shows a micrograph of the corner of a 16-ply stringer formed with equal internal and external radii of 2.5 mm (0.100 inches). Like the 13-ply stringer, there is no notable porosity or voids, although some resin richness can be observed along the boundary of the 0-degree plies near the outside mold line side and the adjacent 90-degree plies. Section A-A shows the resin richness from a longitudinal cut along the stringer radius.

Alternative Ply Orientations

The embodiments disclosed herein use exemplary numbers of plies and exemplary ply directional orientations, such as 0-degree, 45-degree, and 90-degree ply orientations. One of ordinary skill in the art would appreciate, however, that variations in the specified numbers and angles of plies are possible and that other ply directional orientations are possible.

For example, some embodiments may form laminates having greater than approximately 10-15 plies, and containing greater than approximately 20% plies in the longitudinal (0-degree) direction. Still other numbers and relative proportions of plies are possible.

Regarding variations in angles, for example, in aligning the orientation of a ply with a longitudinal direction of a corner of a composite part, the ply orientation may vary from the longitudinal direction approximately ±0-5 degrees, and in some cases ±0-2 degrees. In the transverse direction, a transverse ply may vary from a direction perpendicular to the longitudinal direction of the corner of the composite part approximately ±45 degrees. In other words, the 0-degree ply may range from approximately +5 degrees to −5 degrees, while the 90-degree ply depicted in the figure may range from approximately −45 degrees≤x≤−90 degrees and +45 degrees≤x≤+90 degrees.

Intermediate plies that accommodate torsion forces may be oriented in any direction different from the other two ply directions, with ±45 degrees being typical. As used herein, the terms "generally" and "approximately" are intended to capture these variances.

Regarding other ply directional orientations, possible orientations may include, for example, [0, ±30, 90], [±2, ±45, 90], [±2, ±30, ±75], and [±2, ±65]. Still other combinations are possible. In some cases, the direction associated with the orientation of a first ply and the direction associated with the orientation of a second ply may be angled with respect to one another in the range between 10 degrees and 80 degrees.

Thus, notwithstanding the particular benefits of the particular ply configurations disclosed herein, the present embodiments should be considered broadly applicable to any number of ply directional orientations, and to variances in numbers, angles, and relative proportions of ply directional orientations.

Alternative Corner Geometries

In addition, although embodiments disclosed herein involve composite parts having circular corners, other shapes of corners are possible. For example, conical or splined corner geometries may be accommodated using the resin and ply migration techniques disclosed herein. Accordingly, notwithstanding the particular benefits of the circular and radius-type geometries disclosed herein, the present embodiments should be considered broadly applicable to any shape of a corner. Examples of different curve geometries for corners that may be used in other embodiments include, but are not limited to: lines, conic curves, elliptical curves, parabolic curves, hyperbolic curves, circular curves, as well as possibly other kinds of curves.

Figure 21:
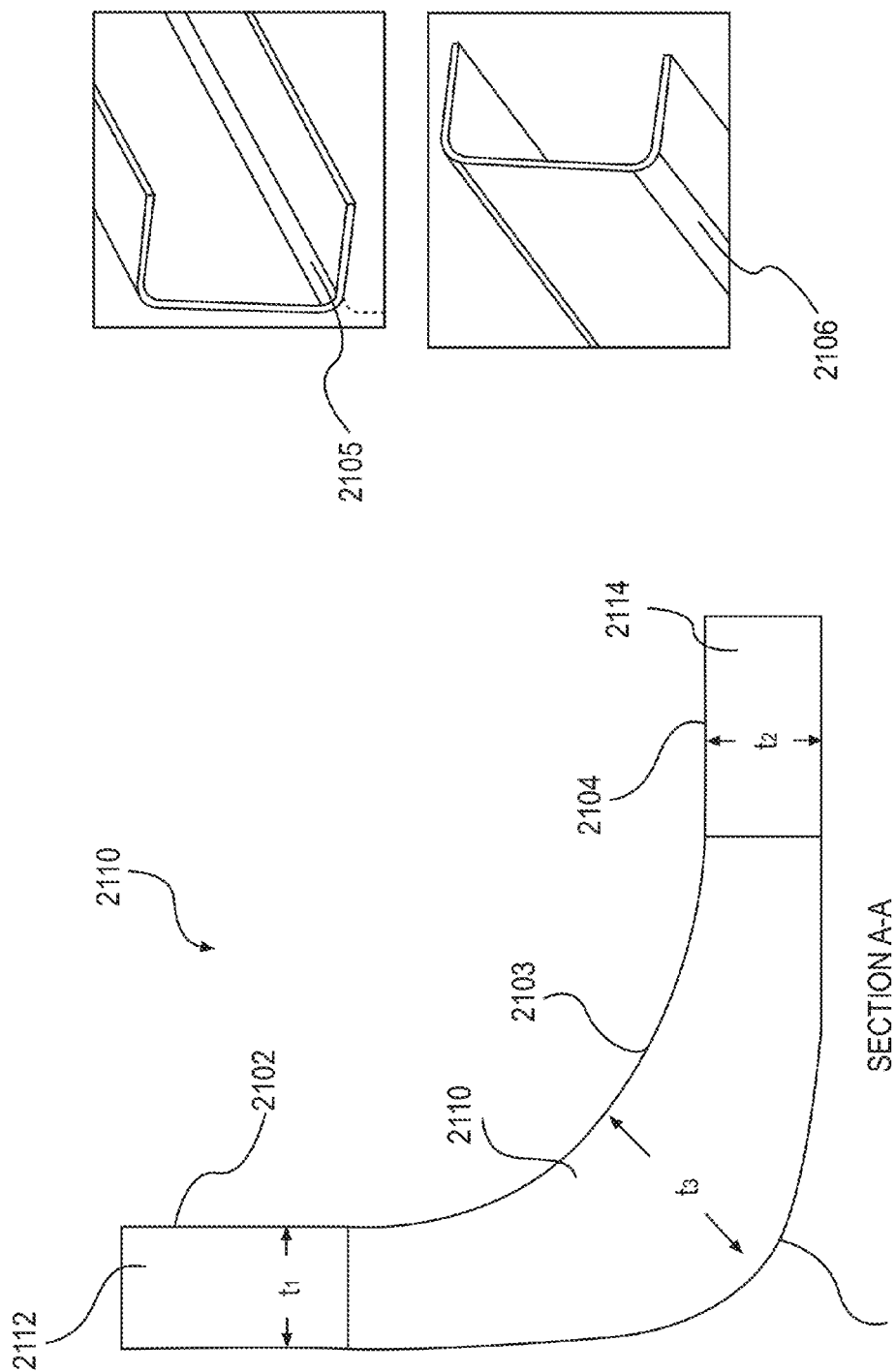
FIG. 21 is a schematic diagram illustrating a cross-section of an embodiment of a corner including inner and outer curves as well as adjacent surfaces to those curves. The diagram also illustrates isometric views of a c-channel, highlighting the inner and outer corner surfaces.
Figure 22:
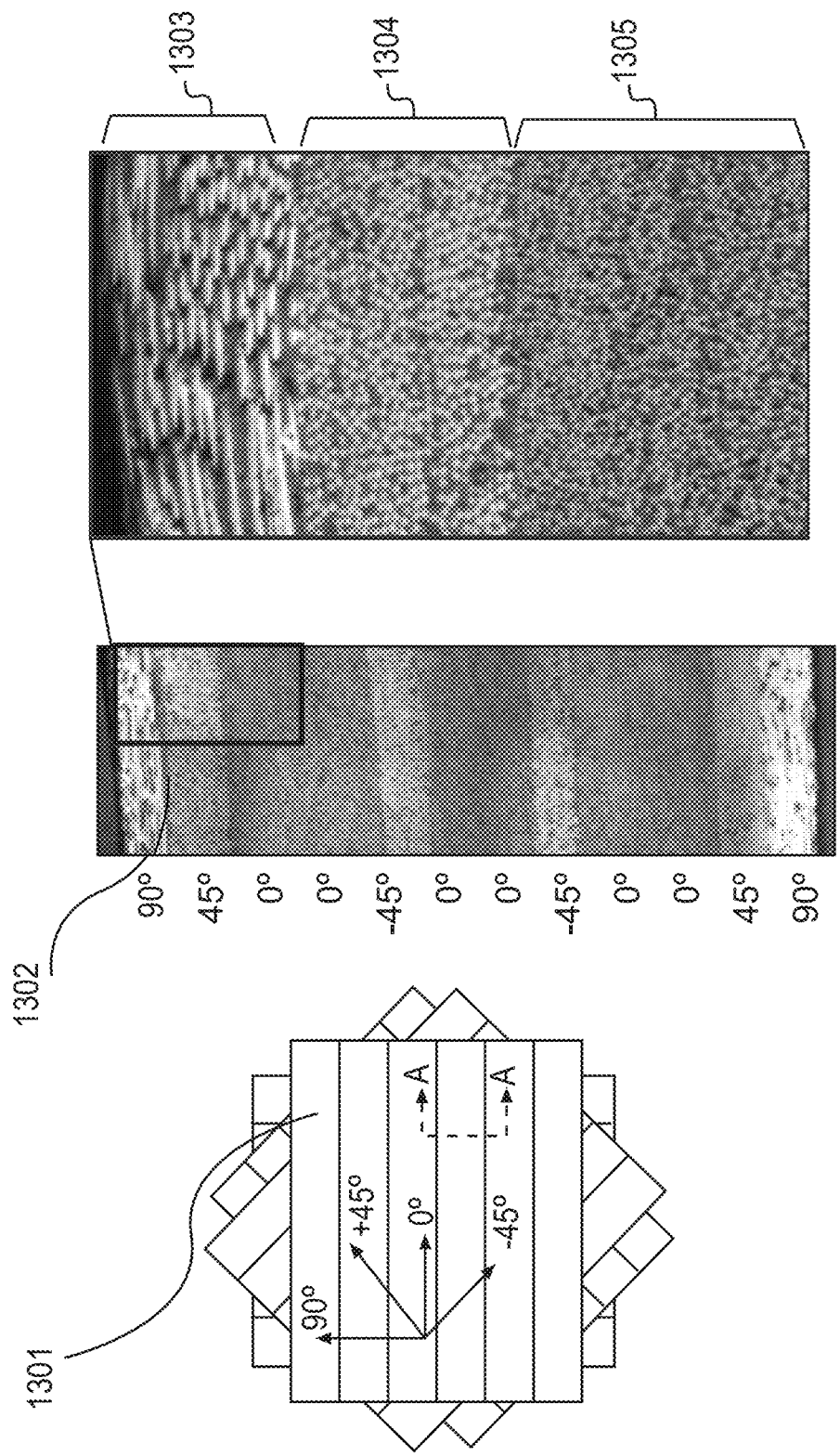
FIG. 22 includes several schematic views of adjacent laminate plies under magnification, where the different fiber orientations can be seen under magnification, according to an embodiment.

The embodiments described herein apply to any corner of variable thickness, where the maximum thickness in any area of the corner is greater than the thickness of any sections or portions immediately adjacent to the corner. Referring now to FIG. 21, a part 2100 (depicted here as a stringer type part) comprises a first adjacent section 2112 and a second adjacent section 2114 and a corner portion 2110 at the interface of first adjacent section 2112 and second adjacent section 2114. Corner portion 2110 is further associated with an interior surface 2103 and an exterior surface 2101. Moreover, corner portion 2110 has a thickness t3. The first adjacent section 2112 is associated with a thickness t1, while the second adjacent section 2114 is associated with a thickness t2. In some cases, thickness t1 and thickness t2 could be substantially similar, while in other cases they could be substantially different. In this embodiment, thickness t3 is substantially greater than both thickness t1 and thickness t2.

Although the current embodiment illustrates a part with substantially flat surfaces for first adjacent section 2112 and second adjacent section 2114 (i.e., first interior adjacent surface 2102 and second interior adjacent surface 2104 are both approximately flat in the vicinity of corner portion 2110), other embodiments could comprise adjacent surfaces with any other geometries. For example, in one alternative embodiment, one or more of the adjacent surfaces (inner and/or outer surfaces of the adjacent sections) could be substantially curved. In another alternative embodiment, one adjacent surface could be curved, while another adjacent surface could be flat. Moreover, the geometry of a corner portion and/or adjacent sections may be approximately constant along the longitudinal length of a part (i.e., 2D ruled) or variable.

Parameter Variations

Regarding the control of migration, one of ordinary skill in the art would appreciate that the specific temperatures and pressures applied during a forming process would depend on factors such as the type of material, the number of plies, the shape of the composite part, and the desired extent of material migration. Thus, the present embodiments should be considered broadly applicable to tool and process temperatures and pressures that are appropriate for particular applications.

Material Variations

In addition, the present embodiments should be considered broadly applicable to the press forming of composite parts from different types of materials, including thermoset polymer materials or thermoformed (thermoplastic) polymer materials. In thermoforming thermoplastic materials, heat may be applied to a blank to form a composite part. In contrast, forming thermoset materials may be accomplished with the application of less heat or no heat at all. Composite parts made of thermoset materials may be formed by compression molding without heating, for example. The compression molding alone may achieve a desired intra-ply migration. However, even with thermoset materials, the application of significant heat may be beneficial in facilitating the migration. Accordingly, the present embodiments should be considered to encompass any manufacturing methods that achieve a desired material migration and are appropriate for a given type of blank material.

Embodiments disclosed herein involve composite parts for particular applications. As previously discussed, other embodiments may utilize methods and a corresponding variable thickness corner as described above in a wide variety of composite parts, which may or may not include the particular structures (c-channels, hat-shaped channels, etc.) described above. Some examples of other parts with corners to which these features may apply include, but are not limited to: bathtub fittings, brackets, chords, stiffeners as well as any other parts with corners. Notwithstanding the particular benefits associated with the parts disclosed, the embodiments should be considered broadly applicable to any part having a corner. The embodiments should further be considered broadly applicable to any part comprising elongated members with longitudinally extending corners.

The foregoing disclosure of the embodiments has been presented for purposes of illustration and description. It is not intended to be exhaustive or to limit other embodiments to the precise forms disclosed. Many variations and modifications of the embodiments described herein will be apparent to one of ordinary skill in the art in light of the above disclosure. The scope of the embodiments is to be defined only by the claims appended hereto, and by their equivalents.

Further, in describing representative embodiments of the present embodiments, the specification may have presented the method and/or process of the present embodiments as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present embodiments should not be limited to the performance of their steps in the order written, and one skilled in the art can readily appreciate that the sequences may be varied and still remain within the spirit and scope of the present embodiments.

What is claimed is:

1. A method for manufacturing a composite part from a blank having an intermediate ply oriented in a first direction, a first outer ply disposed on a first side of the intermediate ply and oriented transverse to the first direction, and a second outer ply disposed on a second side of the intermediate ply opposite to the first side and oriented transverse to the first direction, the method comprising:

positioning the blank between a convex die and a concave die, with the intermediate ply oriented with fibers generally parallel to a longitudinal direction in which an internal corner of the concave die and an external corner of the convex die extend, and with the first outer ply and the second outer ply oriented with fibers generally transverse to the longitudinal direction, wherein a radius of the internal corner that forms a corner of the composite part is less than a radius of the external corner that forms the corner of the composite part plus the thickness of a section of the composite part adjacent to the corner of the composite part; and pressing the blank between the convex die and concave die such that fibers of the intermediate ply migrate into the corner of the composite part and provide the intermediate ply with an increased cross-sectional thickness at the corner of the composite part.

2. The method of claim 1, wherein the blank comprises resin, and wherein pressing the blank between the convex die and the concave die causes resin of the intermediate ply to migrate toward the corner of the composite part in between the first and second outer plies.

3. The method of claim 1, wherein the first outer ply faces the concave die and the second outer ply faces the convex die, and wherein the first and second outer plies are positioned at an angle between negative five degrees and five degrees with respect to the longitudinal direction.

4. The method of claim 3, wherein the blank has a plurality of plies that are oriented with fibers in the first direction and are positioned between the first outer ply and the second outer ply.

5. The method of claim 4, wherein fibers of each of the plurality of plies migrate into the corner of the composite part.

6. The method of claim 1, wherein when viewed in a cross-section taken perpendicularly to the longitudinal direction:

the convex die and the concave die are separated by a web gap distance on a web side of the corner of the composite part, the convex die and the concave die are separated by a flange qap distance on a flange side of the corner of the composite part opposite to the web side of the corner, and wherein the web gap distance is less than the flange gap distance.

7. The method of claim 6, wherein the web gap distance is between 0.05% and 4% less than the flange gap distance.

8. The method of claim 1, wherein the composite part comprises an elongated member, wherein the intermediate ply is oriented with fibers generally parallel to a longitudinal axis of the elongated member, and wherein the first outer ply and the second outer ply are oriented with fibers generally transverse to the longitudinal axis of the elongated member.

9. The method of claim 1, wherein the intermediate ply comprises a first intermediate ply, wherein the blank further comprises a second intermediate ply between the first outer ply and the second outer ply, and wherein the second intermediate ply is oriented with fibers at an angle to the fibers of the first outer ply and the fibers of the second outer ply.

10. The method of claim 9, wherein the first intermediate ply is oriented with fibers at approximately 0 degrees to the longitudinal direction, the second outer ply is oriented with fibers at approximately 90 degrees to the longitudinal direction, and the second intermediate ply is oriented with fibers at approximately 45 degrees to the longitudinal direction.

11. The method of claim 1, further comprising heating the blank.

12. The method of claim 11, further comprising heating one or both of the convex die and the concave die.

13. The method of claim 1, wherein pressing the blank between the convex die and the concave die comprises using hydrostatic pressure.

14. The method of claim 1, wherein the first outer ply contacts the concave die, and wherein the pressing pulls new material of the first outer ply into the internal corner of the concave die and provides the first outer ply with a constant cross-sectional thickness through the corner of the composite part that is substantially equal to cross-sectional thicknesses of the first outer ply in regions adjacent to the corner of the composite part.

15. A method for manufacturing a composite part from a blank, the method comprising:

positioning the blank between a convex die and a concave die, wherein the blank has a first outer ply contacting the concave die and oriented in a first direction, an intermediate ply oriented in a second direction, and a second outer ply contacting the convex die and oriented in a third direction, wherein the intermediate ply is disposed between the first outer ply and the second outer ply, wherein the second direction is different from the first direction and the third direction, wherein the intermediate ply is oriented with fibers generally parallel to a longitudinal direction in which an internal corner of the concave die and an external corner of the convex die extend, and wherein a radius of the internal corner that forms a corner of the composite part is less than a radius of the external corner that forms the corner of the composite part plus the thickness of a section of the composite part adjacent to the corner of the composite part; and pressing the blank between the convex die and concave die such that fibers of the intermediate ply migrate into the corner of the composite part to increase the thickness of a portion of the intermediate ply in the corner of the composite part and such that the thickness of a portion of the first outer ply in the corner of the composite part does not substantially change.

16. The method according to claim 15, wherein the blank further comprises a second intermediate ply oriented with fibers in the second direction, wherein the second intermediate ply is disposed between the first intermediate ply and the second outer ply, and wherein fibers of the second intermediate ply migrate into the corner of the composite part when the blank is pressed between the convex die and the concave die to increase the thickness of a portion of the second intermediate ply in the corner of the composite part.

17. The method according to claim 15, wherein pressing the blank between the convex die and the concave die comprises using hydrostatic pressure.

18. The method according to claim 15, wherein pressing generates a structural member that is thicker at the corners than in the adjacent non-corner regions.

19. The method according to claim 15, wherein the first direction is angled with respect to the second direction by an angle in the range between 10 degrees and 80 degrees.

20. The method according to claim 15, wherein the first outer ply and the second outer ply are oriented at any angle between 45 degrees and 90 degrees or between negative 45 degrees and negative 90 degrees with respect to the longitudinal direction.

21. The method according to claim 20, wherein the intermediate ply is generally oriented with fibers at an angle between negative five degrees and five degrees with respect to the longitudinal direction.

22. The method according to claim 15, wherein the first outer ply comprises a composite material including resin and reinforcing fibers, and wherein the relative locations of the reinforcing fibers disposed in the corner of the composite part changes as the blank is pressed.

23. The method according to claim 15, wherein the first outer ply is pulled in from outside the convex and concave dies and conformed to the concave die.

24. The method according to claim 15, wherein the concave die is made of material comprising one of metal and metal alloy.

25. The method according to claim 15, wherein the concave die is one of coated and plated with a non-stick material.

26. The method according to claim 15, wherein the convex die and concave die provide a hard-tooled gap on one side of a variable-thickness corner that is less than a hard-tooled gap on the other side of the variable-thickness corner.

27. A method for manufacturing a composite part from a blank having a first outer ply, a second outer ply, and an intermediate ply in between the first outer ply and the second outer ply, the method comprising:

positioning the blank between a convex die and a concave die, with the intermediate ply oriented with fibers generally parallel to a longitudinal direction in which an internal corner of the concave die extends, wherein the first outer ply and the second outer ply are oriented with fibers generally transverse to the longitudinal direction, wherein the convex die has an external corner that extends in the longitudinal direction and faces the internal corner of the concave die, wherein the convex die and the concave die are separated by a gap distance at straight portions of the convex die and the concave die adjacent to the internal and external corners, and wherein the internal corner of the concave die has a radius that is less than: a radius of the external corner of the convex die plus the gap distance; and pressing the blank between the convex die and the concave die such that fibers and resin of the intermediate ply migrate into a corner of the composite part created between the external corner of the convex die and the internal corner of the concave die, so as to provide the intermediate ply with an increased cross-sectional thickness at the corner of the composite part.

28. The method of claim 27, wherein the composite part comprises a c-channel, wherein the gap distance comprises a first gap distance on a web side of the internal and external corners, wherein the convex die and the concave die are separated by a second gap distance on a flange side of the internal and external corners opposite to the web side, and wherein the first gap distance is less than the second gap distance.

29. The method of claim 28, wherein the first gap distance is between 0.05% and 4% less than the second gap distance.

30. The method of claim 27, wherein the fibers of the first outer ply and the second outer ply are oriented at approximately 90 degrees to the longitudinal direction.

* * * * *